(12) United States Patent
Wilson

(10) Patent No.: US 8,332,349 B1
(45) Date of Patent: *Dec. 11, 2012

(54) ASYNCHRONOUS ACID EVENT-DRIVEN DATA PROCESSING USING AUDIT TRAIL TOOLS FOR TRANSACTION SYSTEMS

(75) Inventor: Thomas R. Wilson, San Francisco, CA (US)

(73) Assignee: Advent Software, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/345,527

(22) Filed: Jan. 6, 2012

(51) Int. Cl.
*G06F 7/00* (2006.01)

(52) U.S. Cl. .......................... 707/607; 707/702

(58) Field of Classification Search .................. None
See application file for complete search history.

(56) References Cited

U.S. PATENT DOCUMENTS

| | | |
|---|---|---|
| 4,805,134 A | 2/1989 | Calo et al. |
| 4,853,842 A | 8/1989 | Thatte et al. |
| 4,972,367 A | 11/1990 | Burke |
| 5,008,786 A | 4/1991 | Thatte |
| 5,010,478 A | 4/1991 | Deran |
| 5,043,885 A | 8/1991 | Robinson |
| 5,136,707 A | 8/1992 | Block et al. |
| 5,202,985 A | 4/1993 | Goyal |
| 5,237,661 A | 8/1993 | Kawamura et al. |
| 5,276,835 A | 1/1994 | Mohan et al. |
| 5,283,884 A | 2/1994 | Menon et al. |
| 5,283,894 A | 2/1994 | Deran |
| 5,305,389 A | 4/1994 | Palmer |
| 5,398,336 A | 3/1995 | Tantry et al. |
| 5,404,477 A | 4/1995 | Jippo |
| 5,408,653 A | 4/1995 | Josten et al. |
| 5,412,805 A | 5/1995 | Jordan, II et al. |
| 5,426,747 A | 6/1995 | Weinreb et al. |
| 5,428,761 A | 6/1995 | Herliy et al. |
| 5,434,992 A | 7/1995 | Mattson |
| 5,437,027 A | 7/1995 | Bannon et al. |
| 5,455,942 A | 10/1995 | Mohan et al. |
| 5,465,352 A | 11/1995 | Nakazawa et al. |
| 5,485,609 A | 1/1996 | Vitter et al. |
| 5,493,668 A | 2/1996 | Elko et al. |
| 5,499,367 A | 3/1996 | Bamford et al. |
| 5,506,984 A | 4/1996 | Miller |

(Continued)

OTHER PUBLICATIONS

"Microsoft SQL Server 2005 Product Overview," by Dumler, Michelle. (2005). Available at: http://www.asystint.co.za/docs/Microsoft/SQLServer%202005%20Overview.pdf Last visited: Apr. 2, 2012.*

(Continued)

*Primary Examiner* — Neveen Abel Jalil
*Assistant Examiner* — Daniel Kinsaul
(74) *Attorney, Agent, or Firm* — Stephen C. Glazier; K&L Gates LLP

(57) ABSTRACT

An audit system structured for auditing at least one operational table of a transaction system during an audit event is provided. In an embodiment, the audit system includes at least one audit history table operatively associated with the operational table of the transaction system, and each audit history table includes at least one database trigger configured for monitoring one or more data changes in the operational table. The database trigger generates an XML message for a monitored data change and transmits it to an SQL server service broker queue, which activates a procedure to transmit the message to at least one subscriber service broker queue, which activates an asynchronous data processing service for the monitored data change.

25 Claims, 24 Drawing Sheets

U.S. PATENT DOCUMENTS

| | | | |
|---|---|---|---|
| 5,550,971 A | 8/1996 | Brunner et al. | |
| 5,560,006 A | 9/1996 | Layden et al. | |
| 5,561,795 A | 10/1996 | Sarkar | |
| 5,574,902 A | 11/1996 | Josten et al. | |
| 5,608,904 A | 3/1997 | Chaudhuri et al. | |
| 5,611,076 A | 3/1997 | Durflinger et al. | |
| 5,615,360 A | 3/1997 | Bezek et al. | |
| 5,636,350 A | 6/1997 | Eick et al. | |
| 5,649,139 A | 7/1997 | Weinreb et al. | |
| 5,668,987 A | 9/1997 | Schneider | |
| 5,680,573 A | 10/1997 | Rubin et al. | |
| 5,682,527 A | 10/1997 | Cooper et al. | |
| 5,701,461 A | 12/1997 | Dalal et al. | |
| 5,706,506 A | 1/1998 | Jensen et al. | |
| 5,727,203 A | 3/1998 | Hapner et al. | |
| 5,745,904 A | 4/1998 | King et al. | |
| 5,758,149 A | 5/1998 | Bierma et al. | |
| 5,787,471 A | 7/1998 | Inoue et al. | |
| 5,805,809 A | 9/1998 | Singh et al. | |
| 5,812,996 A | 9/1998 | Rubin et al. | |
| 5,822,749 A | 10/1998 | Agarwal | |
| 5,826,253 A | 10/1998 | Bredenberg | |
| 5,832,521 A | 11/1998 | Klots et al. | |
| 5,835,908 A | 11/1998 | Bennett et al. | |
| 5,835,959 A | 11/1998 | McCool et al. | |
| 5,864,849 A | 1/1999 | Bohannon et al. | |
| 5,897,634 A | 4/1999 | Attaluri et al. | |
| 5,915,249 A | 6/1999 | Spencer | |
| 5,933,593 A | 8/1999 | Arun et al. | |
| 5,963,937 A | 10/1999 | Yamasaki et al. | |
| 6,009,271 A | 12/1999 | Whatley | |
| 6,014,673 A | 1/2000 | Davis et al. | |
| 6,070,165 A | 5/2000 | Whitmore | |
| 6,081,875 A | 6/2000 | Clifton et al. | |
| 6,173,292 B1 | 1/2001 | Barber et al. | |
| 6,314,417 B1 | 11/2001 | Bennett et al. | |
| 6,321,235 B1 | 11/2001 | Bird | |
| 6,330,565 B1 | 12/2001 | Nesbitt | |
| 6,353,833 B1 | 3/2002 | Bird et al. | |
| 6,446,062 B1 | 9/2002 | Levine et al. | |
| 6,457,021 B1 | 9/2002 | Berkowitz et al. | |
| 6,496,831 B1 | 12/2002 | Baulier et al. | |
| 6,507,847 B1 | 1/2003 | Fleischman | |
| 6,564,215 B1 | 5/2003 | Hsiao et al. | |
| 6,574,639 B2 | 6/2003 | Carey et al. | |
| 6,591,266 B1 | 7/2003 | Li et al. | |
| 6,598,119 B2 | 7/2003 | Becker et al. | |
| 6,609,126 B1 | 8/2003 | Smith et al. | |
| 6,757,690 B2 * | 6/2004 | Aldrich et al. | 707/702 |
| 6,826,560 B1 * | 11/2004 | Leymann et al. | 1/1 |
| 6,865,658 B2 | 3/2005 | Tomori et al. | |
| 6,874,001 B2 | 3/2005 | Narang et al. | |
| 6,947,956 B2 | 9/2005 | Olstad et al. | |
| 6,957,237 B1 | 10/2005 | Traversat et al. | |
| 6,970,872 B1 | 11/2005 | Chandrasekaran et al. | |
| 7,062,480 B2 | 6/2006 | Fay et al. | |
| 7,222,117 B1 | 5/2007 | McGrogan | |
| 7,487,550 B2 * | 2/2009 | Todd | 726/27 |
| 7,543,003 B2 * | 6/2009 | Shukla et al. | 1/1 |
| 7,634,520 B1 | 12/2009 | Seiler et al. | |
| 7,836,031 B2 * | 11/2010 | Howard et al. | 707/702 |
| 2003/0120638 A1 | 6/2003 | Park et al. | |
| 2003/0204504 A1 | 10/2003 | Stuy et al. | |
| 2003/0221068 A1 | 11/2003 | Tsuji et al. | |
| 2003/0225662 A1 | 12/2003 | Horan et al. | |
| 2004/0205048 A1 * | 10/2004 | Pizzo et al. | 707/3 |
| 2007/0083569 A1 * | 4/2007 | Wong et al. | 707/201 |
| 2007/0174331 A1 * | 7/2007 | Wolf et al. | 707/102 |
| 2008/0134211 A1 * | 6/2008 | Cui | 719/318 |
| 2009/0182780 A1 * | 7/2009 | Wong et al. | 707/200 |

OTHER PUBLICATIONS

Kinsley, K.C. and Hughes, C.E., Analysis of a Virtual Memory Model for Maintaining Database Views, IEEE Transactions on Software Engineering, May 1992, pp. 402-409, vol. 18, Issue 5 (abstract only).

Birrell, A., Jones, M. and Wobber, E., A Simple and Efficient Implementation of a Small Database, ACM Symposium on Operating Systems Principles archive, 1987, pp. 149-154 (abstract only).

Traiger, Irving L., Virtual Memory Management for Database Systems, ACM SIGOPS Operating Systems Review archive, 1982, pp. 26-48, vol. 16, Issue 4, ACM Press, New York, NY (abstract only).

Ji, Minwen, Affinity-based Management of Main Memory Database Clusters, ACM Transactions on Internet Technology (TOIT) archive, 2002, pp. 307-339, vol. 2, Issue 4 (abstract only).

Dionn, IronEye Cache—Default branch, Freshmeat.net, May 30, 2003 12:08 PST (abstract only).

Hoverd, Tim, Livestore—Default branch, Freshmeat.net, Oct. 23, 2002 10:22 PST (abstract only).

No author listed, twz1jdbcForMysql—Default branch, Freshmeat.net, Aug. 1, 1998 22:04 PST (abstract only).

Darling, Aaron, mpiBLAST—Default branch, Freshmeat.net, Feb. 11, 2003 19:55 PST (abstract only).

U.S. Appl. No. 11/331,389, filed Jan. 12, 2006.
U.S. Appl. No. 12/546,205, filed Aug. 24, 2009.
U.S. Appl. No. 13/237,240, filed Sep. 20, 2011.
U.S. Appl. No. 13/295,697, filed Nov. 14, 2011.

* cited by examiner

| COLUMN NAME | DATA TYPE | DESCRIPTION |
|---|---|---|
| AuditTypeCodeIn | CHAR | DEFINES THE ROW-LEVEL ACTION TYPE THAT CREATED THIS ROW, EITHER 'I' FOR INSERT, OR 'U' FOR UPDATE. |
| AuditEventIDIn | INTEGER | FOREIGN KEY TO THE AUDITEVENT TABLE. DEFINES THE AUDITED EVENT THAT THIS ROW IS PART OF. |
| AuditTimeStamp | BINARY | UNIQUE INTEGER WITHIN THE DATABASE THAT IS INCREMENTED WITH EACH CHANGE TO THE DATA BASE. |

*FIG. 4*

| COLUMN NAME | DATA TYPE | DESCRIPTION |
|---|---|---|
| AuditTypeCodeOut | CHAR | DEFINES THE ROW-LEVEL ACTION TYPE THAT MADE THIS ROW OBSOLETE, EITHER 'D' FOR DELETE, OR 'U' FOR UPDATE. |
| AuditEventIDOut | INTEGER | FOREIGN KEY TO THE AUDITEVENT TABLE. DEFINES THE AUDITED EVENT FOR WHICH THE OBSOLESCENCE OF THIS ROW IS REQUIRED. |

*FIG. 5*

| COLUMN NAME | DATA TYPE | DESCRIPTION |
| --- | --- | --- |
| AuditID | INTEGER | PRIMARY KEY - UNIQUE AUTO-GENERATED ID FOR AN AUDITED ACTION. AUDITED ACTIONS CAN BE AS ATOMIC AS UPDATING A SINGLE FIELD, OR CAN IDENTIFY A COMPLEX OPERATION SUCH AS A REPOST WHICH MUST BACK OUT AND RE-INSERT MULTIPLE ROWS. IT CAN EVEN IDENTIFY AN EVENT WHICH CAUSED UPDATES TO ROWS IN MULTIPLE TABLES. |
| ActionDate | DATE TIME | DATE AND TIME THE USER PERFORMED THE ACTION. |
| ActionUserID | INTEGER | FOREIGN KEY TO AOUSER TO IDENTIFY THE USER PERFORMING THE ACTION. |
| ModuleID | INTEGER | A FOREIGN KEY TO THE MODULES TABLE, TO RECORD WHICH MODULE THE USER USED TO MAKE CREATE THE EVENT: USER INTERFACE, POST, BATCH SCRIPT, ETC. |
| JobID | INTEGER | A FOREIGN KEY TO THE JOBHISTORY TABLE TO RECORD THE JOB BY WHICH THE ACTION OCCURRED. THIS ALLOWS QUERIES OF THE PARAMETERS FOR THE JOB AND OTHER HISTORICAL INFORMATION. |

*FIG. 6*

| COLUMN NAME | DATA TYPE | DESCRIPTION |
|---|---|---|
| AuditID | INTEGER | FOREIGN KEY TO THE QBAUDITTRAIL TABLE TO IDENTIFY THE AUDITABLE EVENT THIS ROW IS PART OF. |
| TableName | STRING | NAME OF THE TABLE THAT WAS UPDATED AS PART OF THIS AUDITABLE EVENT. THIS COLUMN LETS US KNOW WHICH TABLES TO SELECT AFFECTED ROWS FROM. |
| AuditObjectID | INTEGER | WHEN A PROGRAM KNOWS THAT IT IS MAKING AN UPDATE TO A SINGLE OBJECT, IT MAY RECORD THE PARENT AUDITOBJECT-LEVEL ID HERE. FOR INSTANCE IF THE USER INTERFACE TRANSACTION EDITOR MADE AN UPDATE TO A PORTFOLIO'S TRANSACTIONS, IT WOULD PLACE THE PORTFOLIOID HERE. |

*FIG. 7*

AUDITEVENT

| AUDIT ID | USER ID | ACTION DATE | MODULE |
|---|---|---|---|
| A1 | JOE | 12/1/02 | POST |
| A2 | JOE | 12/1/02 | USER INTERFACE |

*FIG. 8A*

AUDITEVENT TABLE

| AUDITID | TABLE NAME |
|---|---|
| A1 | PORTTRANS |
| A2 | PORTTRANS |

*FIG. 8B*

PORTFOLIO TRANSACTION_AUDIT

| RECID | PORT ID | TRANS DATE | TRANS TYPE | SEC ID | LOT ID | AMT | AUDIT TYPE CODE IN | AUDIT TIME STAMP | AUDIT EVENT IDIN | AUDIT TYPE CODE OUT | AUDIT EVENT IDOUT |
|---|---|---|---|---|---|---|---|---|---|---|---|
| | | | | | | | | | | | |

*FIG. 8D*

PORTFOLIO TRANSACTIONS

| RECID | PORT ID | TRANS DATE | TRANS TYPE | SEC ID | LOT ID | AMT | TYPE IN | TIME STAMPIN | AUDIT IDIN |
|---|---|---|---|---|---|---|---|---|---|
| T1 | POR1 | 12/1/02 | BY | IBM | 1 | 500 | I | 12/1/02 | A1 |
| T2 | POR1 | 12/1/02 | BY | MSFT | 1 | 400 | I | 12/1/02 | A2 |

*FIG. 8C*

AUDITEVENT

| AUDIT ID | USER ID | ACTION DATE | MODULE |
|---|---|---|---|
| A1 | JOE | 12/1/02 | POST |
| A2 | JOE | 12/1/02 | USER INTERFACE |
| A3 | SUE | 12/2/02 | USER INTERFACE |

*FIG. 9A*

AUDITEVENT TABLE

| AUDITID | TABLE NAME |
|---|---|
| A1 | PORTTRANS |
| A2 | PORTTRANS |
| A3 | PORTTRANS |

*FIG. 9B*

PORTFOLIO TRANSACTION_AUDIT

| RECID | PORT ID | TRANS DATE | TRANS TYPE | SEC ID | LOT ID | AMT | AUDIT TYPE CODE IN | AUDIT TIME STAMP | AUDIT EVENT IDIN | AUDIT TYPE CODE OUT | AUDIT EVENT IDOUT |
|---|---|---|---|---|---|---|---|---|---|---|---|
| T2 | POR1 | 12/1/02 | BY | MSFT | 1 | 400 | I | 12/1/02 | A2 | D | A3 |

*FIG. 9D*

PORTFOLIO TRANSACTIONS

| RECID | PORT ID | TRANS DATE | TRANS TYPE | SEC ID | LOT ID | AMT | TYPE IN | TIME STAMPIN | AUDIT IDIN |
|---|---|---|---|---|---|---|---|---|---|
| T1 | POR1 | 12/1/02 | BY | IBM | 1 | 500 | I | 12/1/02 | A1 |

*FIG. 9C*

AUDITEVENT

| AUDIT ID | USER ID | ACTION DATE | MODULE |
|---|---|---|---|
| A1 | JOE | 12/1/02 | POST |
| A2 | JOE | 12/1/02 | EDITOR |
| A3 | SUE | 12/2/02 | EDITOR |
| A4 | BILL | 12/3/02 | EDITOR |

*FIG.10A*

AUDITEVENT TABLE

| AUDITID | TABLE NAME |
|---|---|
| A1 | PORTTRANS |
| A2 | PORTTRANS |
| 1. 3. | PORTTRANS |
| 2. 4. | PORTTRANS |

*FIG.10B*

PORTFOLIO TRANSACTION_AUDIT

| RECID | PORT ID | TRANS DATE | TRANS TYPE | SEC ID | LOT ID | AMT | AUDIT TYPE CODE IN | AUDIT TIME STAMP | AUDIT EVENT IDIN | AUDIT TYPE CODE OUT | AUDIT EVENT IDOUT |
|---|---|---|---|---|---|---|---|---|---|---|---|
| T2 | POR1 | 12/1/02 | BY | MSFT | 1 | 400 | I | 12/1/02 | A2 | D | A3 |
| T1 | POR1 | 12/1/02 | BY | IBM | 1 | 500 | I | 12/2/02 | A1 | U | A4 |

*FIG.10D*

PORTFOLIO TRANSACTIONS

| RECID | PORT ID | TRANS DATE | TRANS TYPE | SEC ID | LOT ID | AMT | TYPE IN | TIME STAMPIN | AUDIT IDIN |
|---|---|---|---|---|---|---|---|---|---|
| T1 | POR1 | 12/1/02 | BY | IBM | 1 | 5000 | U | 12/3/02 | A4 |

*FIG.10C*

HISTTRADEBLOTTER

| REC ID | STATUS | PORT ID | TRANS DATE | TRANS TYPE | SEC ID | AMT | AUDITTYPE CODE IN | AUDIT TIME STAMP | AUDIT EVENT IDIN | AUDITTYPE CODEOUT | AUDIT EVENT IDOUT |
|---|---|---|---|---|---|---|---|---|---|---|---|
| | | | | | | | | | | | |

TRADEBLOTTER

| REC ID | STATUS | PORT ID | TRANS DATE | TRANS TYPE | SEC ID | AMT | AUDITTYPE CODE IN | AUDIT TIME STAMP | AUDIT EVENT IDIN |
|---|---|---|---|---|---|---|---|---|---|
| B1 | NEW | POR1 | 1/25/03 | SL | ORCL | 1000 | I | 1/24/03 | H18 |
| B2 | NEW | POR1 | 1/25/03 | BY | ADVS | 7000 | I | 1/24/03 | H19 |

*FIG. 11A*

AUDITEVENT

| AUDIT ID | USER ID | ACTION DATE | MODULE |
|---|---|---|---|
| A20 | JOE | 1/25/03 | POST |

*FIG. 11B*

AUDITEVENT TABLE

| AUDITID | TABLE NAME |
|---|---|
| A20 | BLOTTER |
| A20 | 1. PORTTRANS |

*FIG. 11C*

| HISTTRADEBLOTTER | | | | | | | | | | | |
|---|---|---|---|---|---|---|---|---|---|---|---|
| REC ID | STATUS | PORT ID | TRANS DATE | TRANS TYPE | SEC ID | AMT | AUDIT TYPE CODE IN | AUDIT TIME STAMP | AUDIT EVENT IDIN | AUDIT TYPE CODE OUT | AUDIT EVENT IDOUT |
| B1 | NEW | POR1 | 1/25/03 | SL | ORCL | 1000 | I | 1/24/03 | A18 | U | A20 |
| B2 | NEW | POR1 | 1/25/03 | BY | 2.DVS | 7000 | I | 1/24/03 | A19 | U | A20 |

*FIG.11D*

| TRADEBLOTTER | | | | | | | | | |
|---|---|---|---|---|---|---|---|---|---|
| REC ID | STATUS | PORT ID | TRANS DATE | TRANS TYPE | SEC ID | AMT | TYPE IN | TIME STAMPIN | AUDIT IDIN |
| B1 | REJECTED | POR1 | 1/25/03 | SL | ORCL | 1000 | U | 1/25/03 | A20 |
| B2 | POSTED | POR1 | 1/25/03 | BY | ADVS | 7000 | U | 1/25/03 | A20 |

*FIG.11E*

| PORTFOLIO TRANSACTION_AUDITS | | | | | | | | | | | |
|---|---|---|---|---|---|---|---|---|---|---|---|
| RECID | PORT ID | TRANS DATE | TRANS TYPE | SEC ID | LOT ID | AMT | AUDIT TYPECODE IN | AUDIT TIME STAMP | AUDIT EVENT IDIN | AUDIT TYPECODE OUT | AUDIT EVENT IDOUT |
| | | | | | | | | | | | |

*FIG.11F*

| PORTFOLIO TRANSACTIONS | | | | | | | | | |
|---|---|---|---|---|---|---|---|---|---|
| RECID | PORT ID | TRANS DATE | TRANS TYPE | SEC ID | LOT ID | AMT | TYPE IN | TIME STAMPIN | AUDIT IDIN |
| T21 | POR1 | 1/25/03 | BY | ADVS | 1 | 7000 | I | 1/25/03 | A20 |

*FIG.11G*

| USER ACTION ▸ | REFERENCE | USER | USING | DATE AND TIME |
|---|---|---|---|---|
| CONTACT RELATED AC | REGION SETS RESET RATES ROLES | ADMIN | APX WEB FORM | 7/21/2005 2:39 PM |
| CONTACT RELATED AC | SECURITIES | ADMIN | APX WEB FORM | 7/21/2005 2:41 PM |

SHOW 10 ▾ RESULTS PER PAGE. (2 RESULTS)     ⏮ ◂ PAGE 1 OF 1 ▸ ⏭

*FIG. 12B*

| ACTION ▼ | ITEM TYPE | ITEM ID | VIEW ACTION DETAILS |
|---|---|---|---|
| UPDATED | CONTACT ADDRESS | APPLETON, JASON: HOME | THIS ACTION |
| UPDATED  1406 | CONTACT ADDRESS | | |

SHOW [10 ▼] RESULTS PER PAGE. (2 RESULTS)

ACTION DETAILS -- WEB PAGE DIALOG

ACTION DETAILS

ACTION        UPDATED
CONTACT    APPLETON, JASON: HOME
ADDRESS

| FIELD ▼ | OLD VALUE | NEW VALUE |
|---|---|---|
| CITY | BLOOMINGTON | BLOOMINGTON HEIGHTS |
| LINE 1 | 100 INDIANA STREET | 3454 WELLINGTON AVENUE |
| ROW VERSION (SYSTEM FIELD) | 3 | 4 |
| ZIP | 41251 | 41253 |

SHOW [10 ▼] RESULTS PER PAGE. (4 RESULTS)    ▏◀ ◀ PAGE 1 OF 1 ▶ ▶▏

COPYRIGHT © 2004 - 2005 ADVENT SOFTWARE, INC. ALL RIGHTS RESERVED

TRUSTED SITES

HISTORY FOR: WILSON, JOSEPH STEVEN

INDIVIDUAL

| USER | USING | ACTION | ITEM ID | DATE AND TIME | VIEW ACTION DETAILS |
|---|---|---|---|---|---|
| ADMIN | APX WEB FORM | INSERTED | WILSON, JOSEPH | 21.07.2005 21:29 | THIS ACTION |
| ADMIN | APX WEB FORM | UPDATED | WILSON, JOSEPH STEVEN | 21.07.2005 21:30 | THIS ACTION |

SHOW MAX ▶ RESULTS PER PAGE. (2 RESULTS)   PAGE 1 OF 1 ▶

ADDRESSES

| USER | USING | ACTION | ITEM ID | DATE AND TIME | VIEW ACTION DETAILS |
|---|---|---|---|---|---|
| ADMIN | APX WEB FORM | INSERTED | WILSON, JOSEPH: HOME | 21.07.2005 21:29 | THIS ACTION |
| ADMIN | APX WEB FORM | INSERTED | WILSON, JOSEPH: HOME | 21.07.2005 21:29 | THIS ACTION |

SHOW MAX ▶ RESULTS PER PAGE. (2 RESULTS)   PAGE 1 OF 1 ▶

*FIG. 17A*

| | PHONE NUMBERS | | | | |
|---|---|---|---|---|---|
| | USER | USING | ACTION | ITEM ID | DATE AND TIME ▲ | VIEW ACTION DETAILS |
| 1706 | ADMIN | APX WEB FORM | INSERTED | WILSON, JOSEPH: CELLULAR | 21.07.2005 21:29 | THIS ACTION |
| | ADMIN | APX WEB FORM | INSERTED | WILSON, JOSEPH: HOME | 21.07.2005 21:29 | THIS ACTION |
| | ADMIN | APX WEB FORM | INSERTED | WILSON, JOSEPH: BUSINESS | 21.07.2005 21:29 | THIS ACTION |
| | ADMIN | APX WEB FORM | INSERTED | WILSON, JOSEPH: OTHER | 21.07.2005 21:29 | THIS ACTION |
| | ADMIN | APX WEB FORM | UPDATED | WILSON, JOSEPH STEVEN: CELLULAR | 21.07.2005 21:30 | THIS ACTION |
| | SHOW 10 ▼ RESULTS PER PAGE. (5 RESULTS) | | | | ◄◄ ◄ PAGE 1 OF 1 ► ►► |

⊞ CONTACT RELATIONSHIPS

⊞ PORTFOLIO RELATIONSHIPS (INTERESTED PARTIES)

⊞ ACTIVITIES

*FIG. 17B*

| | ADDRESSES | | | | |
|---|---|---|---|---|---|
| | PHONE NUMBERS | | | | |
| | USER | USING | ACTION | ITEM ID | DATE AND TIME ▲ | VIEW ACTION DETAILS |
| 1804 | ADMIN | APX WEB FORM | INSERTED | WILSON, JOSEPH: CELLULAR | 21.07.2005 21:29 | THIS ACTION |
| | ADMIN | APX WEB FORM | INSERTED | WILSON, JOSEPH: HOME | 21.07.2005 21:29 | THIS ACTION |
| | ADMIN | APX WEB FORM | INSERTED | WILSON, JOSEPH: BUSINESS | 21.07.2005 21:29 | THIS ACTION |
| | ADMIN | APX WEB FORM | INSERTED | WILSON, JOSEPH: OTHER | 21.07.2005 21:29 | THIS ACTION |
| | ADMIN | APX WEB FORM | UPDATED | WILSON, JOSEPH STEVEN: CELLULAR | 21.07.2005 21:30 | THIS ACTION |
| 1802 | SHOW 10 ▼ RESULTS PER PAGE. (5 RESULTS) | | | | | |

ACTION DETAILS

| ACTION | UPDATED |
|---|---|
| CONTACT | WILSON, JOSEPH STEVEN: |
| PHONE | CELLULAR |

| FIELD ▼ | OLD VALUE | NEW VALUE |
|---|---|---|
| CONTACT NAME | WILSON, JOSEPH | WILSON, JOSEPH STEVEN |
| PHONE | | (650) 245-1179 |

SHOW MAX ▼ RESULTS PER PAGE. (2 RESULTS)    PAGE 1 OF 1

| | CONTACT RELATIONSHIPS |
|---|---|
| | PORTFOLIO RELATIONSHIPS (INTERESTED PARTIES) |
| | ACTIVITIES |

*FIG. 18B*

ASYNCHRONOUS ACID EVENT-DRIVEN DATA PROCESSING USING AUDIT TRAIL TOOLS FOR TRANSACTION SYSTEMS

FIELD OF THE INVENTION

The present invention generally relates to capturing, recording and/or processing changes to data stored in a computer-based transaction system. The invention more particularly relates to processing, storing and presenting audit event data using audit triggers in association with data changes in a computer-based transaction system.

BACKGROUND

A frequent requirement in database applications is to perform some processing based on a change in data. There are two common solutions to this problem.

One common solution is for a processing program to issue the data changes and then initiate the processing. One disadvantage of this approach is that it is avoidable; that is, the data processing occurs only if the program that is to process the data is the same program that changed the data. That is, if the data is changed by some other code paths or program, then the desired associated processing does not happen. This disadvantage of this solution leads to the "all data changes must happen in our data layer" approach, i.e. all data processing and data changes must occur within a part of the system environment controlled by one party. This is in conflict with an open, flexible system design.

A second common solution to the problem of performing processing based on a change in data is to put code in a trigger to detect the change and perform the processing. This solution catches all data changes but has a different disadvantage; that is, it makes the underlying SQL transaction resulting from the trigger much more complex. This lengthens its processing time, and increases the probability of a deadlock and rollback. Deadlock occurs when two processes are attempting to update the same data, and neither can proceed to completion because the data each process is attempting to update is locked by the other process. Rollback is when an SQL transaction, or a set of SQL actions, such as, insert, update, and delete, is undone and the database returns to the state the database was in before the transaction started.

For many commercial enterprises, it is a challenge to implement information technology strategies that can deal effectively with the constantly changing and accelerating data requirements of the business world, especially in the financial services area. Effective and efficient systems and processes are essential to the success of any business that needs to capture, store, and manipulate transaction data and, for audit purposes, to track and report changes made to the data.

In view of the problems described above, improvements are needed that can cure the deficiencies of conventional systems for auditing data changes in transaction systems, including prior approaches to using audit triggers.

BRIEF DESCRIPTION OF THE FIGURES

The utility of the embodiments of the invention will be readily appreciated and understood from consideration of the following description of the embodiments of the invention when viewed in connection with the accompanying drawings.

FIGS. 4 through 7 illustrate examples of columns or data fields that may be included in a table structured in association with an embodiment of the prior art;

FIGS. 8A through 11O include schematic versions of tables that illustrate examples of various auditing processes that may be conducted in accordance with an embodiment of the prior art; and, FIGS. 12A through 18B include screen displays of an example of an audit trail viewer that may be provided in accordance with an embodiment of the prior art.

DESCRIPTION OF EMBODIMENTS OF THE PRESENT INVENTION

Figure 1:
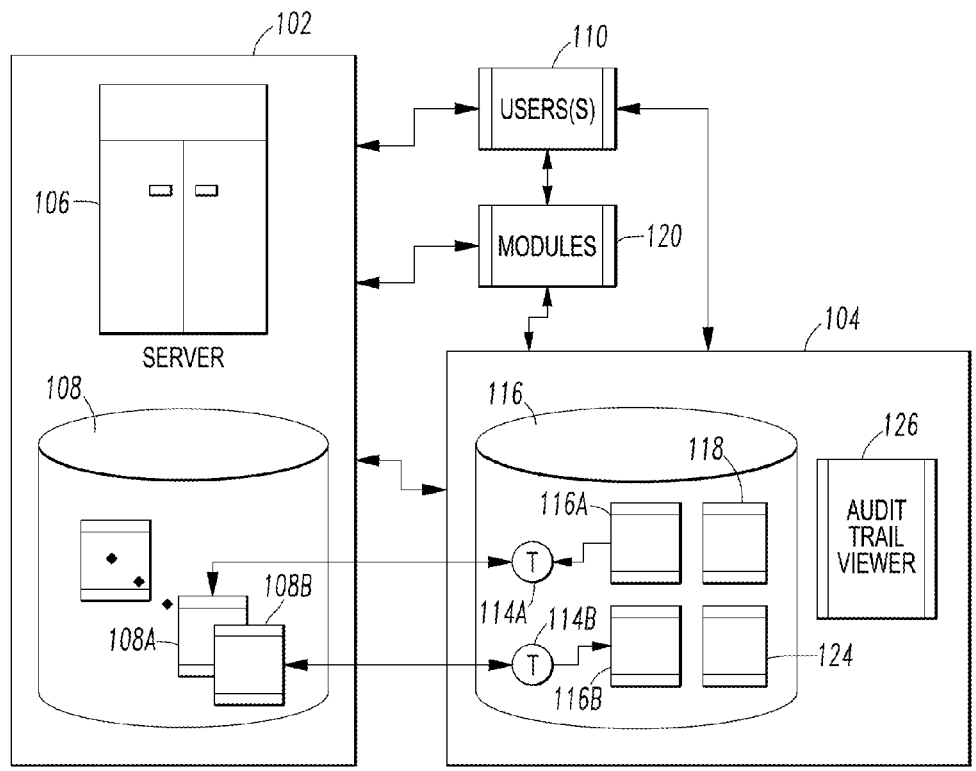
FIG. 1 includes a schematic diagram illustrating aspects of an example audit system provided in accordance with an embodiment of the prior art.

Embodiments of the present invention for the first time provide solutions to the disadvantages of the prior art referred to above. The present invention is an improvement over the prior database audit trigger approach, as described above and in U.S. Pat. No. 7,634,520, issued 15 Dec. 2009, for "Audit Trail Tools for Transaction Systems," which patent is incorporated in its entirety herein by this reference.

An embodiment of the present invention will be made available in release 4.0 of the APX product ("APX 4"), of Advent Software, Inc., of San Francisco, Calif. APX 4 embodies the present invention in an improvement of the prior APX audit trigger system and method.

APX 4 has at least one code-generating audit trigger 1910 for each audit history table 1912. A process may check for a flag in the metadata, which may be a metadata table including a list of all application tables, with flags indicating whether the table is audited and whether the table is published, and generate additional code in the audit trigger 1910 based on the flags. This code creates an XML message containing the audit ID, table ID, and primary keys, which may be the set of columns that uniquely identify each row in a table, of the modified rows in the data records that are modified by the data change. The XML message is sent to a SQL server service broker queue 1911, such as the Microsoft SQL Service Broker queue.

Embodiments of the present invention may have the following points: (1) The audit trigger 1910 mechanism is unavoidable, i.e., no matter what process performs the update, the XML message is sent. (2) The XML message design is lightweight (given that APX is already doing data row auditing); that is, the XML message uses just the primary keys of the changed data rows. Because APX audits all changes, downstream processing can use the primary keys to inspect the rows for relevant changes. (3) It is transactional, i.e., the messages are sent within the trigger. If for any reason the transaction is rolled back, the message is not committed to the service broker queue. (4) It does not increase the chance of transaction blocking because SQL server service queues are designed for high insert/delete-only queuing. And it provides for asynchronous processing of the additional steps out of the site of the transaction. (5) It is uniform, i.e., all audit history tables perform notification the same way. And (6) it is datadriven code-generation, i.e., the inclusion of the message code in the trigger is defined by a flag in a metadata table, not by hand-written triggers.

The XML trigger messages are sent to a single SQL server service broker queue 1911. When each message arrives in the queue it activates a routing procedure 1913. The routing procedure 1913 uses two metadata tables 1914 to determine the subscribers of each data change event. The first of the metadata tables 1914 may be a Subscriber table, which may include four columns, SubscriberID, Name, IsEnabled, and ServiceName. SubscriberID may be an artificial integer key for the subscriber, Name may be an external name for the subscriber, IsEnabled may be a flag for whether messages are to be sent to this subscriber, and ServiceName may be the system name of the Service Broker service to receive the XML messages. The second of the metatables 1914 may be a Filter table. The Filter table may have columns for SubscriberID, TableID, SendInsert, SendUpdate, and SendDelete. Each row of the Filter table may define for a (SubsriberID, TableID) pair whether to send notifications of inserts, update, and deletes to the table identified by TableID. The metadata tables 1914 define a list of subscribers, the audit history tables they subscribe to, and the events of interest on those tables, e.g. insert, update, and/or delete. The incoming XML messages are then transmitted to each applicable subscriber, based on the subscriber's tables and events. Standard subscribers include Moxy, for securities and transactions changes, APX Row Change, for recalculating derived data, and APX application server cache, for notifying the application server when cached metadata changes.

The routing procedure 1913 also performs some message aggregations, e.g., if multiple messages are received a short time window, they are combined into a single message and sent to the applicable subscribers. This reduces the number of messages sent to subscribers. Typically, this aggregation will be for the row changes in a single transaction.

Each subscriber has its own service broker queue. This queue may be served by an internal activation procedure (i.e., a stored procedure) or an external service listening to the queue. Each processing service is asynchronous, out of band with the initial data change, reliable (i.e., the XML message will be generated with the data change), and multi-way (i.e., multiple processes can independently respond to the same change).

APX is an integrated portfolio account system, including investment transactions, market data about securities, and contact relationship management data. Moxy is a trade order management system, helping asset managers define and execute trades. Processes in using the improved database audit trigger mechanism of the claimed invention may include: (1) APX to Moxy 1923 notification of portfolio and security changes; (2) APX to application server notification of look up table changes to the metadata cache in the application server; (3) APX notifications of object changes to keep the APX Reporting system (Rep) object cache synchronized with the APX database; and (4) recalculation notifications for APX derived data tables, including changes in prices, portfolio transactions, security properties such as call dates, and so on.

Figure 19:
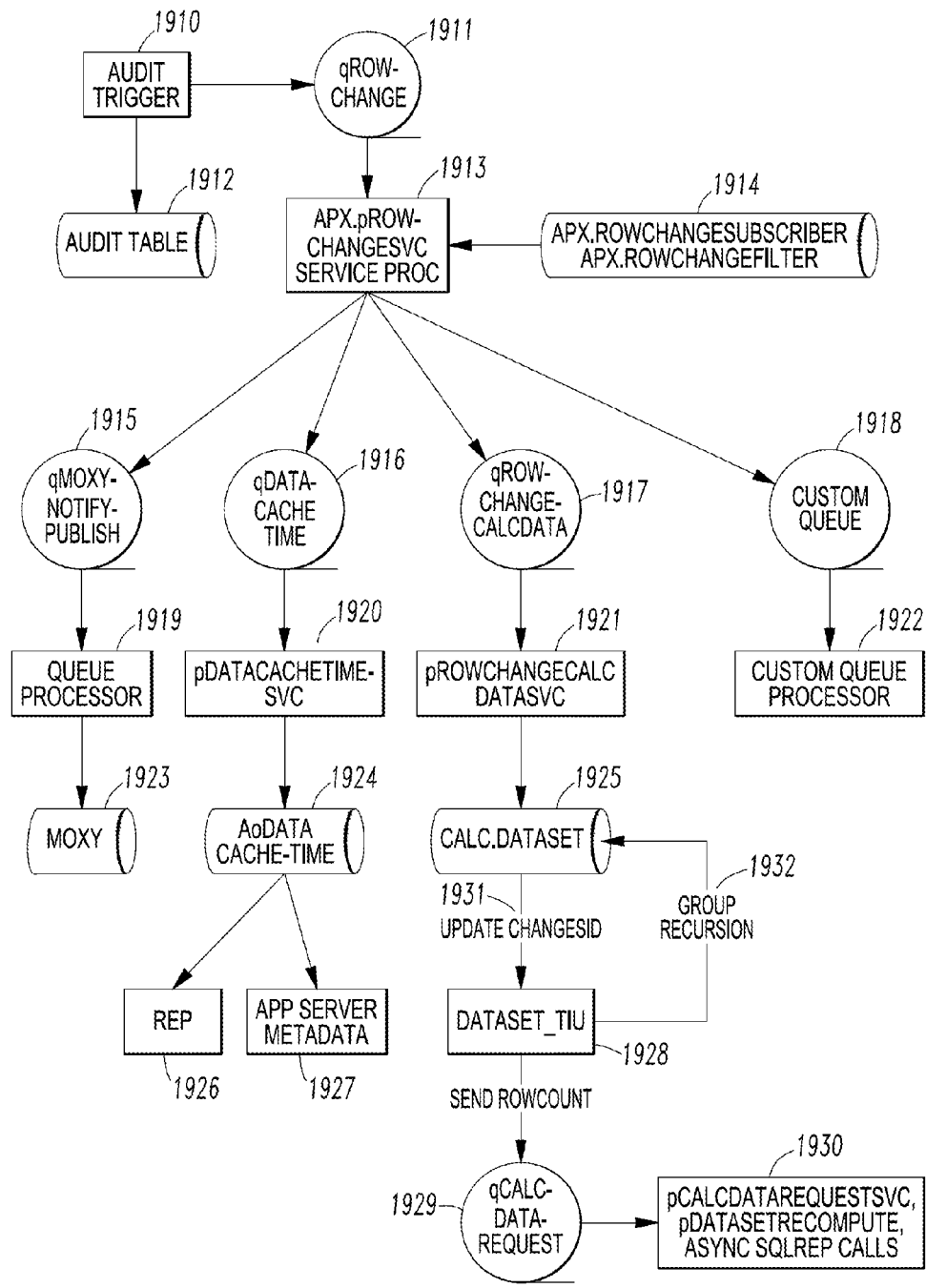
FIG. 19 shows a data flow diagram for the present invention, showing the APX row-change publish/subscribe data flow.

Referring to FIG. 19, an audit trigger 1910 may be a mechanism which detects audit events, which may be changes made to data in a data table, such as an audit history table or an operational table. When the audit trigger 1910 is activated by a data change, information regarding the data change may be recorded in an audit table 1912. The audit table 1912 may include a single row for each audited event. The audit table 1912 may be configured to track the user who made data changes, what was used to make the data changes, the time/date the data change was made, and/or a "JobID" if the event was caused by the actions of a script, for example. The audit table 1912 permits grouping of all related table-level transactions together. The audit table 1912 also permits the audit system 104 to record relationships between individual transactions; for example, to record that a set of portfolio transactions comprise a repost request. The audit table 1912 also permits grouping together data changes that occur against multiple tables, but which may produce a single logical action or transaction; for example, posting a trade blotter transaction updates the status of the blotter row and inserts a transaction row. This information can be tracked by inserting one row in the audit table 1912 for each table affected by the audit event. The audit table 1912 may be configured such that only one row exists for each logical action even if it resulted in multiple transactions or data changes to multiple tables. In summary, the audit table 1912 tracks the tables that are affected by an audit event.

The audit trigger 1910 may be computer-generated code. When an audit event is detected, the audit trigger 1910 may generate an XML message containing the audit ID, table ID, and primary keys of the modified rows in the data records that were modified by the data change. The XML message may be sent to an SQL server service broker queue, which may be qRowChange queue 1911.

The qRowChange queue 1911 may be attached to the activation procedure APX.pRowChangeSvc service process 1913. APX.pRowChangeSvc service process 1913 may be executed by the SQL server when a new row appears in the qRowChange queue 1911, for example, after the qRowChange queue 1911 receives a new XML message from the audit trigger 1910.

The APX.pRowChangeSvc service process 1913 may pick up each XML message and compare it to the tables APX.RowChangeSubscriber and APX.RowChangeFilter 1914, which may be tables of Subscribers and the table IDs that the Subscribers care about. For each table, the Subscriber defines whether they want to received inserts, updates, and deletes for that table. Different Subscribers can specify that they only want Security and Security Type related tables (Moxy), or portfolio tables (AoDataCacheTime.) Copies of the relevant XML messages from the qRowChange queue 1911 are dropped into a queue for each Subscriber by the APX.pRowChangeSvc service process 1913, based on the type of XML messages desired by each Subscriber.

Each Subscriber may have a separate queue, and a processor attached to that queue for processing the XML notifications in the queue. A qMoxyNotifyPublish queue 1915 may be the queue for notifying Moxy of portfolio and security changes, based on the data changes that activated the audit trigger 1910. A Queue processor 1919 may be attached to the qMoxyNotifyPublish queue 1915. The Queue processor 1919 may process each XML message in the qMoxyNotifyPublish queue 1915 and make the appropriate changes to Moxy tables 1923.

A qDataCacheTime queue 1916 may be the queue for changes to the AoDataCacheTime table 1924. A pDataCacheTimeSvc service process 1920 may be attached to the qDataCacheTime queue 1916, and may process the XML messages in the qDataCacheTime queue 1916. The AoDataCacheTime table 1924 may track the last time an object in a data table, such as an operation table, was touched. Touching of an object may include, for example, retrieving or changing the object. The XML messages in the qDataCacheTime queue 1916 may be used to update the times in the AoDataCacheTime table 1924. The AoDataCacheTime table 1924 may be used by an APX Reporting System (Rep) process 1926 to determine whether the Rep cache is out of date, and may also be used by an AppServer MetaData process 1927 to determine if a metadata cache is out of date.

A qRowChangeCalcData queue 1917 may be the queue for changes to data tables that were derived using the data in, for example, an operational table. Changes to the data in an operational table may necessitate a recalculation of any data tables derived from data in the operational table. A pRowChangeCalcDataSvc service process 1921 may be attached to the qRowChangeCalcData queue 1917. The qRowChangeCalcData queue 1917 may process the XML messages in the gRowChangeCalcData queue 1917, and make the appropriate changes to a Calc.DataSet table 1925, which may include the data used to calculate the derived data tables. Changes made to the Calc.DataSet table 1925 may be sent to a DataSet_TIU process 1928, which may send messages to a qCalcDataRequest queue 1929. The qCalcDataRequest queue 1929 may have a pCalcDataRequestSvc, pDataSetRecompute, and asynchronous SqlRep calls service process 1930 attached, which may use the data changes to recompute the derived data tables. Mechanisms for the recalculation of the derived data tables may include group recursion 1932 and update ChangesID 1932.

A Custom queue 1918 may also be supported. The Custom queue 1918, and attached Custom Queue Processor 1922, may be custom Subscribers added after a build of APX has been released.

Figure 20:
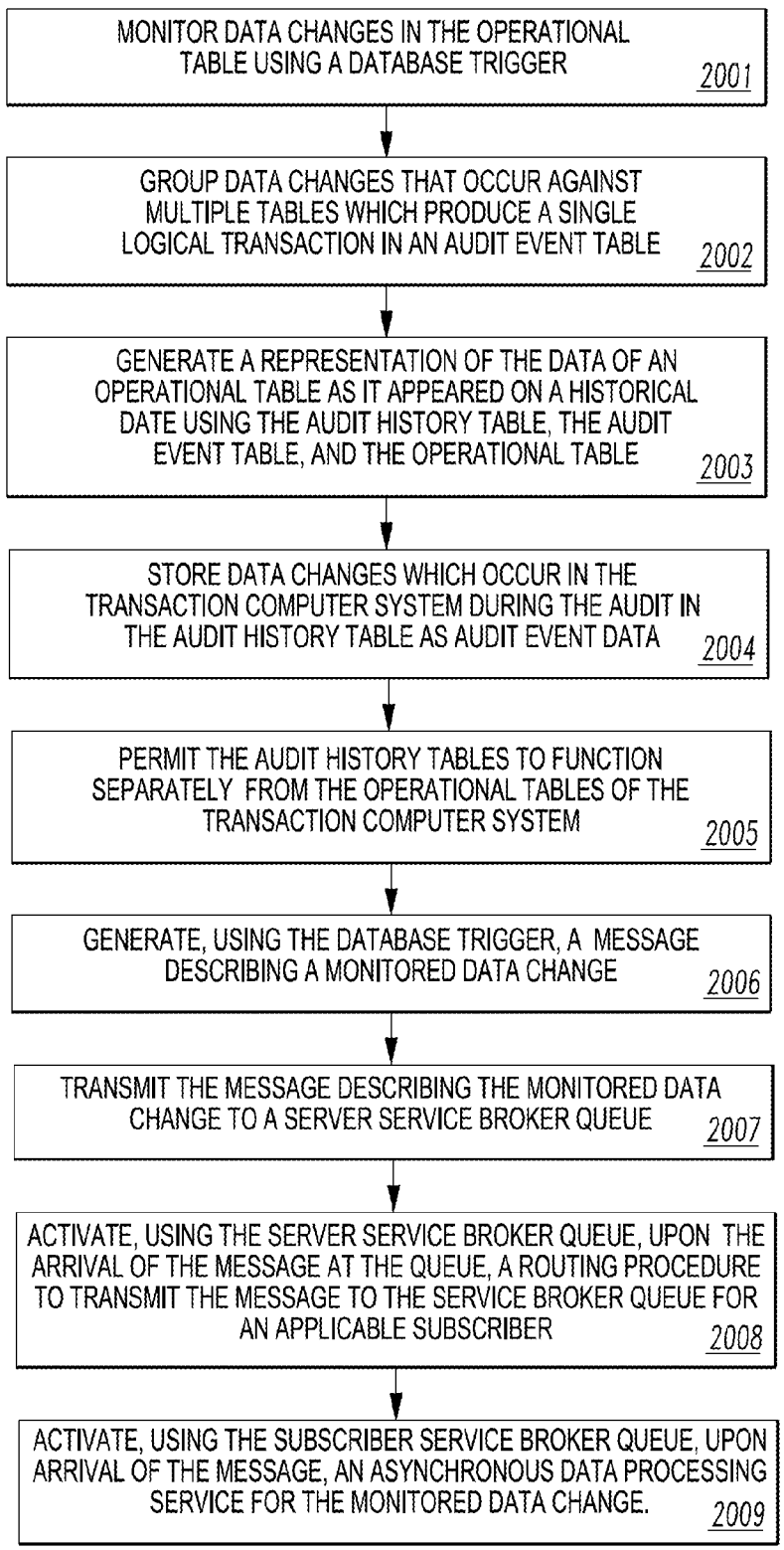
FIG. 20 shows a procedure for implementing the APX row-change publish/subscribe data flow.

FIG. 20 shows a procedure for implementing the APX row-change publish/subscribe data flow. In block 2001 a computer system may monitor data changes made to the operational table of the transaction computer system. The computer system may use a database trigger associated with an audit history table.

In block 2002, the computer system may group together data changes that occur against multiple tables when those data changes produce a single logical transaction in an audit event table.

In block 2003, the computer system may generate at least one representation of the data of an operational table as it appeared on a historical date using the audit history table, the audit event table, and the operational table. In block 2004, the computer system may store the data changes which occur in the transaction computer system during the audit by storing the data changes in the audit history table as audit event data.

In block 2005, the computer system may permit the audit history tables to function separately from the operational tables of the transaction computer system.

In block 2006 the computer system may use a database trigger, for example the audit trigger 1910, to generate a message describing a monitored data change. The message may be, for example, an XML message.

In block 2007, the computer system may transmit the message to a server service broker queue, such as, for example, the qRowChange queue 1911.

In block 2008, the server service broker queue may be used to activate a routing procedure upon the arrival of the message at the queue, transmitting the message to the servicer broker queue of an applicable subscriber. For example, the APX.pRowChangesSvc service process 1913 may use the APX.RowChangeSubscriber and APX.RowChangeFilter tables 1914 to determine to which subscribers to transmit the message. The service broker queue for the subscribers may be, for example, the qMoxyNotifyPublish queue 1915, the qDataCache queue 1916, the qRowChangeCalcData queue 1917, or a Custom queue 1918.

In block 2009, the subscriber service broker queue, upon arrival of the message, may activate an asynchronous data processing service for the monitored data change. For example, the qMoxyNotifyPublish queue 1915 may activate Queue Processor 1919, the qDataCache queue 1916 may activate the pDataCahceTimeSvc service processor 1920, the gRowChangeCalcData queue 1917 may activate the pRowChangeCalcDataSvc service process 1921, and a Custom queue 1918 may activate a Custom queue processor 1922.

An Embodiment

Embodiments of the present invention provide a publish/subscribe trigger mechanism for data row change events. This allows event-driven programming to be implemented at the database level. This improved trigger mechanism is an extension to the existing audit trigger mechanism, i.e. with the improved trigger, the notification of data changes to initiate processing happens as part of the auditing trigger function.

The first example was the feature of notifying Moxy 1923 on changes to Securities and Security types in the APX database. We have a similar internal issue with updates to AoDataCacheTime to track the last time that an object was touched. The AoDataCacheTime table 1924 is used by the APX Reporting System (Rep) 1926 to see whether the Rep cache is out of date; it is also used for notification of the app server that its metadata cache is out of date.

The net result is that we can do reliable, asynchronous, event-driven programming in the database that does not increase the blocking of other processes. In the case of AoDataCacheTime, the changes appear in AoDataCacheTime table 1924 within about 2 seconds of the original change. (I could make it faster, but I have currently coded it to do event accumulation to reduce the number of messages passed on from the RowChange queue.)

Extensibility

The Subscriber queue must be a SQL Server queue, but because of the routing features of Service Broker, it can be on an entirely different database or even different server.

Further, the routing procedure and Service Broker use by-name routing at run time, so Subscribers can be added after a build is released—for example, a custom queue written by advent custom engineering, or by a client if we released instructions.

Definition of Published Tables

All tables in the application database are designated at design time that their data will be published. This is defined in the file sd4 RowAuditTable.xml which defines all the auditing metadata. Tables to be published have a Publish-Changes="1" attribute defined.

At build time, the generated audit triggers have an additional fragment that creates XML of the primary keys of the rows that were changed; this is sent to the RowChange queue 1911. The usage of code-generation means that whether a table is published does not require a lookup to metadata a run-time; the code is simply present or not depending on whether the table is published. A sample code fragment is:

Publish Row Changes

```
declare @xmlPublish xml
set @xmlPublish=(
select
   [@TableID]=094,
   [@DBAction]='I',
   [@AuditEventID]=@auditID,
   (
      select SecurityID
```

```
        from inserted
        for xml raw, type
    )
    for XML path('RowChange')
    )
    exec APX.pRowChangeSubmit @auditID, @xmlPublish
```
This code places a message containing the keys of the new Security rows in the APX.qRowChange queue 1911.

Note that sending a Service Broker message is part of the SQL transaction, but it is not supposed to block messages by other SQL transactions. The other approach would be to update timestamps in other tables, but makes a larger SQL transaction because more tables are involved in the update. The RowChange mechanism replaces hand-written triggers that updated AoDataCacheTime, which is an in-transaction table update, increasing the chance of transaction deadlocks.

Service Broker Conversations

Each Server Process ID (SPID) sends Service Broker conversations on a separate conversation handle. These are long-running conversations—they are never closed. The handles are tracked in the table APX.SessionInfo.

Processing APX.qRowChange

The queue APX.qRowChange 1911 is attached to the activation procedure APX.pRowChangeSvc 1913. This procedure is executed by SQL Server when a new row appears in APX.qRowChange 1911. In APX 4.0 it is configured with up to 5 instances of the stored procedure running in parallel.

APX.pRowChangeSvc 1913 picks up each message and compares it to a table of Subscribers and the table IDs that the Subscriber cares about. Different Subscribers can specify that they only want Security and Security Type related tables (Moxy), or portfolio tables (AoDataCacheTime.) Copies of the relevant messages are dropped into a queue for each Subscriber. The list of subscribers is in APX.RowChangeSubscriber 1914. Each subscriber defines the tables that they care about in APX.RowChangeFilter 1914. For each table, the subscriber defines whether they want to received inserts, updates, and deletes for that table.

Code for Each Subscriber

A service procedure is written for each Subscriber to do whatever is necessary with the data that appears in its queue. This can be a stored procedure that is fired when an item appears in the queue, or it can be an external program that is watching the queue.

Other Embodiment Details

The contents of the subscription tables can be shown with the query following:

```
select sub.SubscriberName, tab.TableName,
    filt.SubscriberID, filt.TableID,
    SendInsert, SendUpdate, SendDelete
from APX.RowChangeSubscriber sub
join       APX.RowChangeFilter       filt       on
    filt.SubscriberID=sub.SubscriberID
join dbo.AdvTable tab on tab.TableID=filt.TableID order by
    SubscriberName, TableName
```

Sample output from this query is as follows:

| Subscriber Name | Table Name | Sub-scriber-ID | Table-ID | Send Insert | Send Update | Send Delete |
|---|---|---|---|---|---|---|
| APX/CalcData | AdvPortfolioTransaction | 5 | 70 | 1 | 1 | 1 |
| APX/CalcData | AdvPriceHistory | 5 | 77 | 1 | 1 | 1 |
| DataCacheTime | AdvPortfolio | 1 | 59 | 1 | 1 | 1 |
| DataCacheTime | AdvPortfolioBase | 1 | 61 | 1 | 1 | 1 |
| DataCacheTime | AdvPortfolioProperty | 1 | 67 | 1 | 1 | 1 |
| DataCacheTime | AdvPortfolioSummary | 1 | 69 | 1 | 1 | 1 |
| DataCacheTime | AdvPortfolioTransaction-Recon | 1 | 226 | 1 | 1 | 1 |
| DataCacheTime | AoObject | 1 | 137 | 1 | 1 | 1 |
| DataCacheTime | InterestedParty | 1 | 190 | 1 | 1 | 1 |
| DataCacheTime | PortfolioSetting | 1 | 68 | 1 | 1 | 1 |
| DataCacheTime | ResponsibleParty | 1 | 299 | 1 | 1 | 1 |
| Moxy/AllocationSync | AdvPortfolioTransaction | 3 | 70 | 1 | 1 | 1 |
| Moxy/AllocationSync | AdvTradeBlotterLine | 3 | 111 | 1 | 1 | 1 |
| Moxy/Object-Sync | AdvFixedIncome | 2 | 36 | 1 | 1 | 1 |
| Moxy/Object-Sync | AdvSecTypeBase | 2 | 90 | 1 | 1 | 1 |
| Moxy/Object Sync | AdvSecTypeBaseCurrency | 2 | 91 | 1 | 1 | 1 |
| Moxy/Object Sync | AdvSecTypeVariant | 2 | 93 | 1 | 1 | 1 |
| Moxy/Object Sync | AdvSecurity | 2 | 94 | 1 | 1 | 1 |
| Moxy/Object Sync | AdvVRS | 2 | 115 | 1 | 1 | 1 |

Other Embodiments

Other embodiments of the present invention may store PublishRowChanges flags in the database and allow re-generation of the trigger without rebuilding the database. This allows custom notification, which involves new tables.

Some embodiments may provide message routing in pRowChangeSvc 1913 by sending an XML message. Alternatively, embodiments may provide message routing by sending table parameters, thus avoiding the creation and parsing of the XML message by each subscriber.

An Embodiment of the Prior Art

Various embodiments of the prior art provide auditing methods and systems that can be configured and executed to track, summarize, and/or process data changes associated with the data stored in a transaction system. For purposes of auditing a transaction system, embodiments of the prior art can be employed to track system data manipulated by multiple users and can reconstruct historical events and their associated data changes. The prior art may employ an application-level implementation strategy to capture and summarize all database-level data changes related to a particular entity, such as an investment portfolio or an investor, for example. In addition, in various embodiments, the prior art can be configured to optimize run-time operations of a transaction system by separating audit event data tables from the operational tables of the transaction system.

Figure 2:
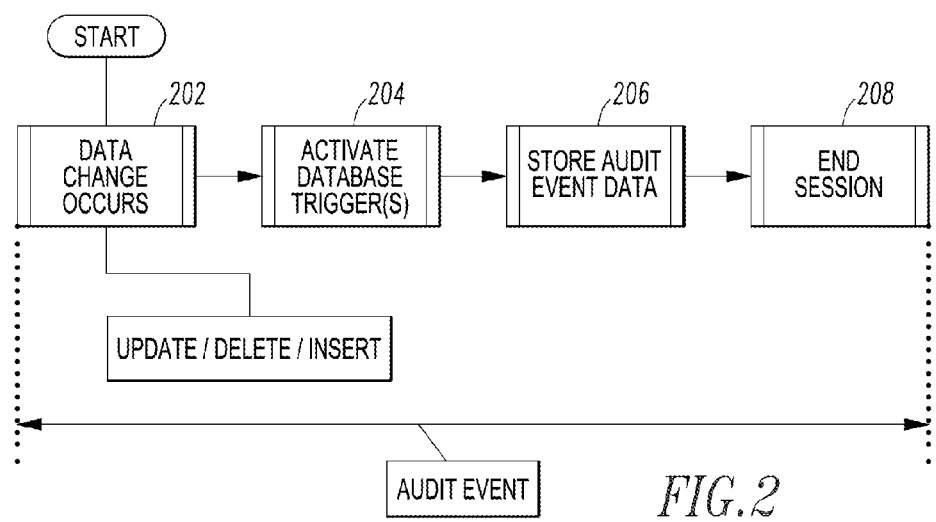
FIG. 2 includes a flow diagram of an auditing method that may be performed in association with an embodiment of the prior art.
Figure 3:
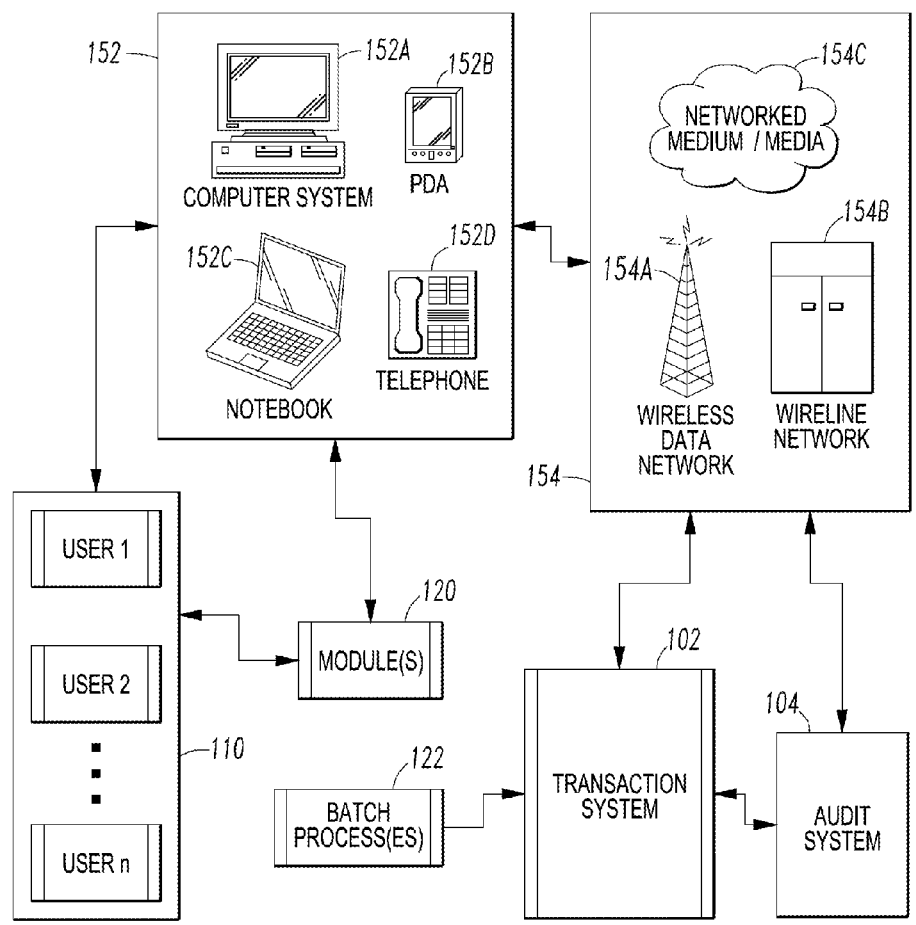
FIG. 3 includes a schematic diagram illustrating aspects of an example audit system provided in accordance with an embodiment of the prior art.

Referring now to FIGS. 1 through 3, the interaction between an example of a transaction system 102 and an example of an auditing system 104 is illustrated in accordance with embodiments of the prior art. The transaction system 102 includes a server 106 operatively associated with a database 108 which includes multiple operational tables 108A, 108B that store various data for the transaction system 102. The multiple operational tables 108A, 108B of the transaction system 102 are represented by "AuditedTableA" (108A) and "AuditedTableB" (108B). For convenience of disclosure, only two multiple operational tables 108A, 108B are illustrated; those skilled in the art can appreciate that more or less than this number of operational tables can be employed within the scope of the prior art.

The transaction system 102 can be configured to facilitate and process financial transactions, for example, including permitting one or more users 110 to execute data changes in association with the financial data stored in the transaction system 102. In the context of a financial transaction system 102, one or more of the users 110 may be portfolio managers, investors, investment advisors, system administrators, and/or a variety of other types of users. The server 106 may be an SQL server executing a "Windows" type operating system, for example, or any other server or computer system suitable for managing and executing manipulation of data in the transaction system 102.

Each of operational tables 108A, 108E may be operatively associated with one or more database triggers 114A, 114B of the audit system 104 that monitor data changes made to the operational tables 108A, 108B by users 110, for example, at step 202. During an audit event, the database triggers 114A, 114B activate at step 204 and cause the audit event data associated with data changes effected during the audit event to be stored at step 206. The audit event data may be stored in a database 116 including one or more audit history tables 116A, 116B that are operatively associated with the operational tables 108A, 108B. Thus, the capture and storage of audit event data derived from data changes made to the operational tables 108A, 108B may be initiated by trigger-initiated stored procedures. In various embodiments, static, pre-defined database triggers 114A, 114B may be implemented by the audit system 104 that monitor activity within the operational tables 108A, 108B and write to static, pre-defined audit history tables 116A, 116B, thereby substantially limiting nm-time processing of the transaction system 102 to manipulation of current data in the operational tables 108A, 108B. The audit event is completed once the session ends (e.g., the user 110 logs out of the transaction system 102) at step 208.

One benefit of the audit system 104 is realized in the use of the audit history tables 116A, 116B to support the ability to generate a "knowledge date" for data in the transaction system 102. The transaction system 102 data can be searched and presented as it appeared on an historical date, without any corrections that were entered after that date, even if the correction was for an effective date before the specified historical date. This is a useful tool for reproducing customer statements and other reports as of the report creation date. Another benefit of maintaining separate audit history tables 116A, 116B for historical information is the ability to secure the tables 116A, 116B by conventional data security processes and devices. It can be seen that separating the function of the operational tables 108A, 108B from the function of the audit history tables 116A, 116B can minimize the operational overhead for maintaining historical information and audit event data. The audit system 104 may store all historical records in the separate audit history tables 116A, 116B, so that the transaction system 102 operational tables 108A, 108B contain only current data.

With reference to FIG. 3, the users 110 may communicate with the transaction system 102 and/or the audit system 104 with a variety of access devices 152 through a variety of communication media 154. Examples of access devices 152 that may be employed by the users 110 include, without limitation, computer systems 152A, personal digital assistants 152B, notebook computers 152C, and/or telephones 152D (of either wireline or wireless variety). Examples of communication media that can be employed include, without limitation, wireless data networks 154A, wireline networks 154B, and/or a variety of networked media 154C.

In operation of various embodiments of the prior art, audit event data is captured and stored through application by the audit system 104 of an approach that involves row-versioning auditing methods, which are known to be an efficient model for processing, capturing and storing transaction-style rows of data. This approach may also include accepting row-level insert, update, and delete commands from users 110 and generating corresponding row insert, update and delete commands that create data entries in the operational tables 108A, 108B, the audit history tables 116A, 116B, and/or other tables (see discussion below). The schematic illustration of FIG. 4 displays an example of columns that may be associated with each of the operational tables 108A, 108B to facilitate the auditing processes described herein.

The audit system 104 may be configured to capture and summarize data changes arising from the operational tables 108A, 108B by category (e.g., portfolio, security, contact, etc.) so that the user 110 can review all data changes based on that category (e.g., a particular portfolio, security, or contact, etc.). It can be seen that this is advantageous in comparison to merely reviewing changes to each individual database record, for example. Examples of categories by which data changes may tracked include, without limitation, the following categories (and sub-categories): portfolio (settings and labels, transaction information, reconciliation information, associated contacts, registered representative membership, group and composite membership, performance history); contact (settings, addresses & phone numbers, associated manager, group membership, associated contacts, associated portfolios); market data (securities event dates, security prices, securities corporate reorganization definitions, index definitions, rates, currency definitions, exchange rates); users (settings, group membership, roles, data associations, profile settings, session history); system settings; global default settings; configurations; audit settings; report settings (associated styles, permissioning, menu membership); macro definitions; output creation; collection membership; automation packages; custodian interface definitions; field settings; custom field definitions; captions and display settings; and, general information (industry group, industry sector, asset class, withholding tax, currency, country, state, holiday, holiday schedule, exchange, brokerage, lot location).

The audit history tables 116A, 116B of the transaction system 102 may be represented by "AuditedTableA_Audit" (116A) and "AuditedTableB_Audit" (116B). The audit history tables 116A, 116B may be stored in the database 116 in the audit system 104 separate from and/or independent of the database 108 of the transaction system 102. An audit history table may be configured for each operational table for which auditing is desired. The audit history tables 116A, 116B let users 110 see how data in the transaction system 102 looked during prior time periods. The audit history tables 116A, 116B also serve as a data source from which archiving can be performed to permit archive systems and processes to work independently of the current data in the operational tables of the transaction system 102. The table of FIG. 5 illustrates examples of the columns that may be included in each of the audit history tables 116A, 116B to facilitate the auditing processes described herein. Also, the audit history tables 116A, 116B may contain the same columns or data fields as the operational tables, for example, in addition to the columns shown in FIG. 5.

In addition, an audit event table 118 (illustrated as "AuditEvent" table as shown in FIG. 1) may be included in the audit system 104 that includes a single row for each audited event. The audit event table 118 may be configured to track the user 110 who made data changes, a module 120 or other access tool the user 110 used, the time/date the data change was made, and/or a "JobID" if the event was caused by the actions of a script, for example. It can be seen that tracking the JobID permits backtracking to the actual parameters and log files for a batch process 122, for example, that may have created the audit event. The audit event table 118 permits grouping of all related table-level transactions together. The audit event table 118 also permits the audit system 104 to record relationships between individual transactions; for example, to record that a set of portfolio transactions comprise a repost request. The audit event table 118 also permits grouping together data changes that occur against multiple tables, but which may produce a single logical action or transaction; for example, posting a trade blotter transaction updates the status of the blotter row and inserts a transaction row. This information can be tracked by inserting one row in the audit event table 118 for each table affected by the audit event. The audit event table 118 may be configured such that only one row exists for each logical action even if it resulted in multiple transactions or data changes to multiple tables. In summary, the audit event table 118 tracks the tables that are affected by an audit event. With reference to FIG. 6, examples of columns that may be included in the audit event table 118 are shown.

In addition, an "AuditEventTable" table 124 may be included in the audit system 104. The "AuditEventTable" table 124 permits identification of the relationship between related row-level operations even if the operations are in different tables. The "AuditEventTable" table 124 lets the user 110 find all the table actions that comprise an audit event without searching through all the various individual operational tables 108A, 108B. With reference to FIG. 7, examples of columns that may be included in the "AuditEventTable" table 124 are shown.

The following examples illustrate how the audit event table 118, the "AuditEventTable" table 124, the operational tables 108A, 108B, and the audit history tables 116A, 116B may be populated by the audit system 104 during the auditing process to generate audit trail information. For convenience of illustration, a "PortfolioTransactions" table and a "PortfolioTransaction_Audit" table are used to represent auditing that can be performed on any row-audited or operational table. Many of the columns show text names or identification for purposes of readability. Also, the TimeStamp columns can contain time data as well as date information, but the time data has been omitted for convenience of disclosure. Those skilled in the art will appreciate that these examples are included primarily for the purpose of illustrating various aspects of the prior art and are not necessarily intended to limit the scope of the prior art.

With reference to FIGS. 8A through 8D, Joe adds two transactions to the transaction system 102: a buy transaction of IBM (via Post), and a buy transaction of MSFT (via the user interface). Each transaction places a row in the audit event table (FIG. 8A), the "AuditEventTable" table (FIG. 8B), and the PortfolioTransactions table (FIG. 8C). In this example, insert transactions have no impact on the "PortfolioTransaction_Audit" table (FIG. 8D).

With reference to FIGS. 9A through 9D, the next day Sue discovers that the buy transaction for MSFT (record T2) inserted by Joe on the previous day is erroneous and should be deleted. To reflect this deletion data change, the transaction is moved from the "PortfolioTransactions" table (FIG. 9C) to the "PortfolioTransaction_Audit" table (FIG. 9D) and its TypeOut, TimeStampOut, and AuditIDOut fields are updated. Also, a row is created in each of the audit event table (FIG. 9A) and the "AuditEventTable" table (FIG. 9B).

With reference to FIGS. 10A through 10D, the following day Bill finds out that the purchase IBM transaction (record 1) is incorrect: the amount should actually be 5000 instead of 500. To reflect this update, the audit system 104 copies the old contents of the row to the "PortfolioTransaction_Audit" table (FIG. 10C), and marks it with the date obsolete and updates the appropriate data in the "PortfolioTransaction" table (FIG. 10D). Changes corresponding to this update transaction are also reflected in the audit event table (FIG. 10A) and the "AuditEventTable" table (FIG. 10B), as shown.

FIGS. 11A through 11G illustrate the usefulness of the "AuditEventTable" table with respect to conducting an audit on multiple tables affected by an action or audit event. As shown, posting two requests in the "TradeBlotter" table (FIG. 11A) results in generation of the rows shown in the audit event table (FIG. 11B) and the "AuditEventTable" table (FIG. 11C). For purposes of this example, it is assumed that the "Trade-Blotter" table (FIG. 11A) is a row-audited table and contains a Status column which may be set to New, Posted, or Rejected. When a trade blotter row is posted, first its status is set to Posted, and at a later time clean up processes delete the posted row and move it to an appropriate audit history table 116A, 116B. If a trade blotter row is rejected, then its status is simply updated to Rejected. Setting up auditing on the "TradeBlotter" table is useful for auditing who or what posted a transaction, as well as for auditing the history of the Trade-Blotter record before it was posted. The data changes are captured as illustrated in FIGS. 11D through 11G. Processes performed with the "AuditEventTable" table, such as the update of the blotter row and the insertion of the transaction row, may be considered part of the same audit event. Accordingly, in certain embodiments of the prior art, these data changes may be "undone" as a group given that the audit system 104 has captured the audit trail of the transactions used initially to create the data changes.

Those skilled in the art can appreciate that embodiments of the audit system 104 described herein can track substantially all changes that users and unattended application processes (e.g., batch processes 122) may make to the database 108 to promote a more comprehensive record of every data change that has occurred during an audit event within the transaction system 102. The audit system 104 can be implemented at the database level of the transaction system 102 to detect changes to the underlying data regardless of which web page, user interface, or other module 120 is used to make the data changes. The audit history tables 116A, 116B of the audit system 104 maintain records for substantially all inserts, updates, and/or deletes and enable the ability to review "before" and "after" data values as a result of data changes. In addition, the audit system 104 can determine the sequence of data changes that occurred during an audit event by maintaining a globally unique sequence number across audit system 104 records. Also, administrative changes such as adding or deleting users, creating or modifying roles, and changing user group assignments, for example, can be captured by the audit system 104 for subsequent audit purposes.

Referring now to FIGS. 12 through 18, various aspects of a sample audit trail viewer 126 that can be configured in accordance with the audit system embodiments of the prior art are illustrated are shown by way of various screen displays.

Figure 12A:
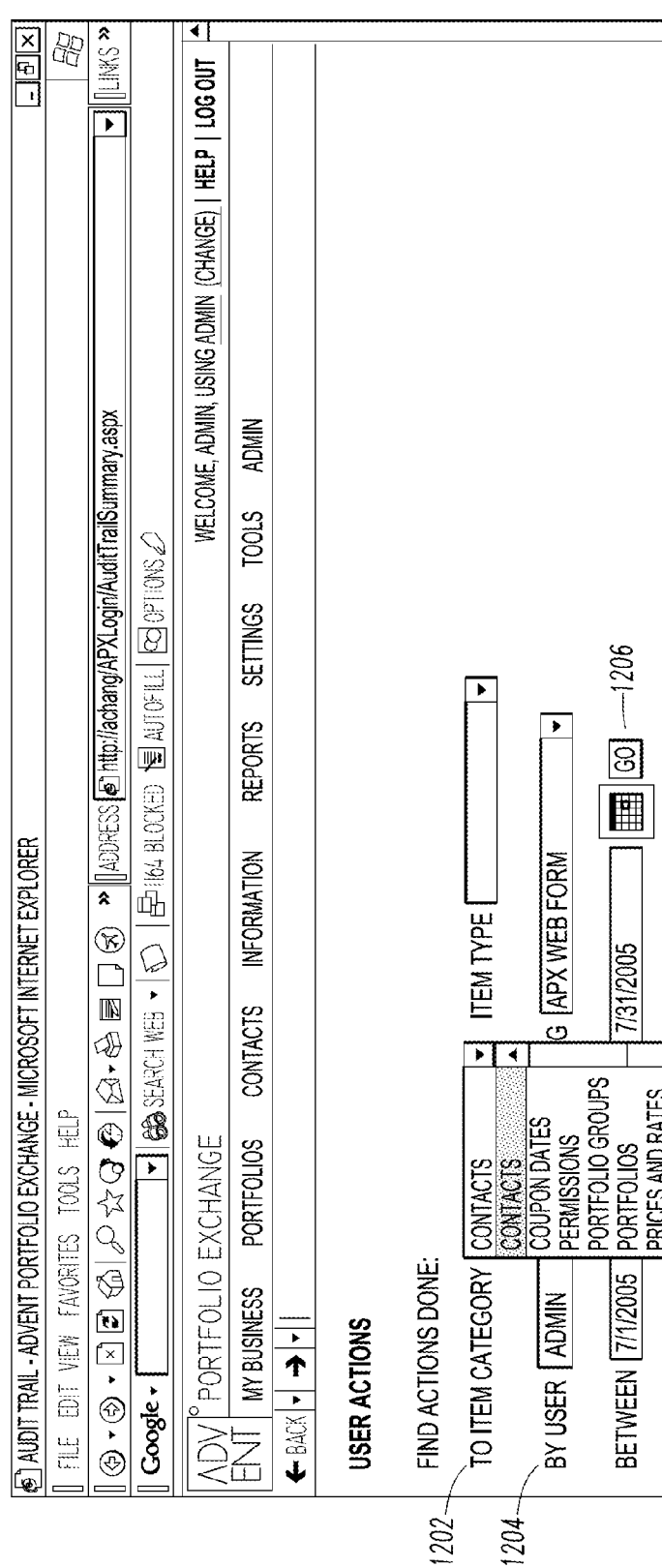

As shown in the screen display of FIGS. 12A and 12B, the user 110 can query the audit system 104 for an audit event for a given category 1202, by a particular user 1204, and/or for a given time period 1206.

Figure 13:
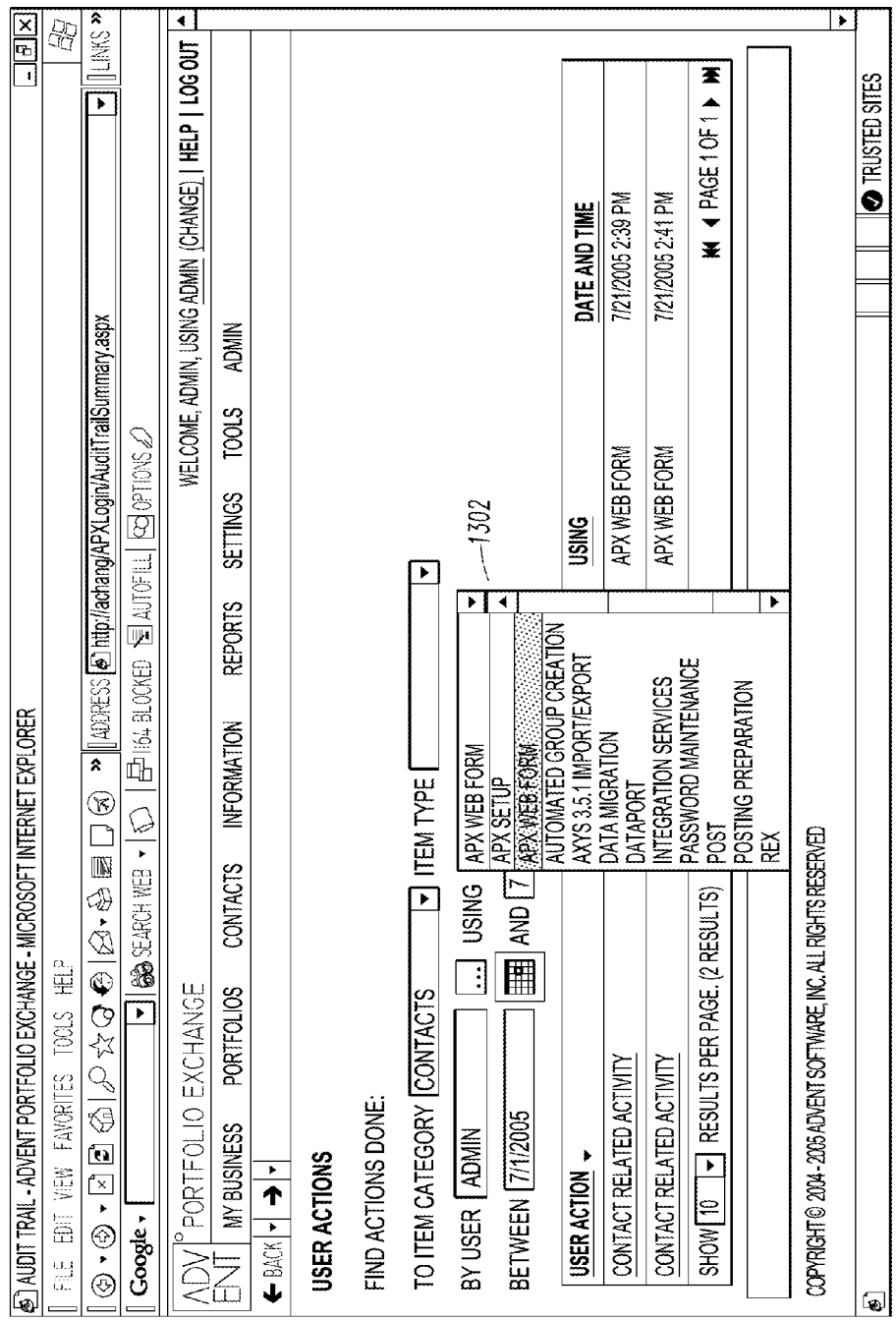

With reference to FIG. 13, the audit system 104 can be queried by a particular module 1302 or other tool that was employed by the user 110 to effect a data change in the transaction system 102.

Figure 14:
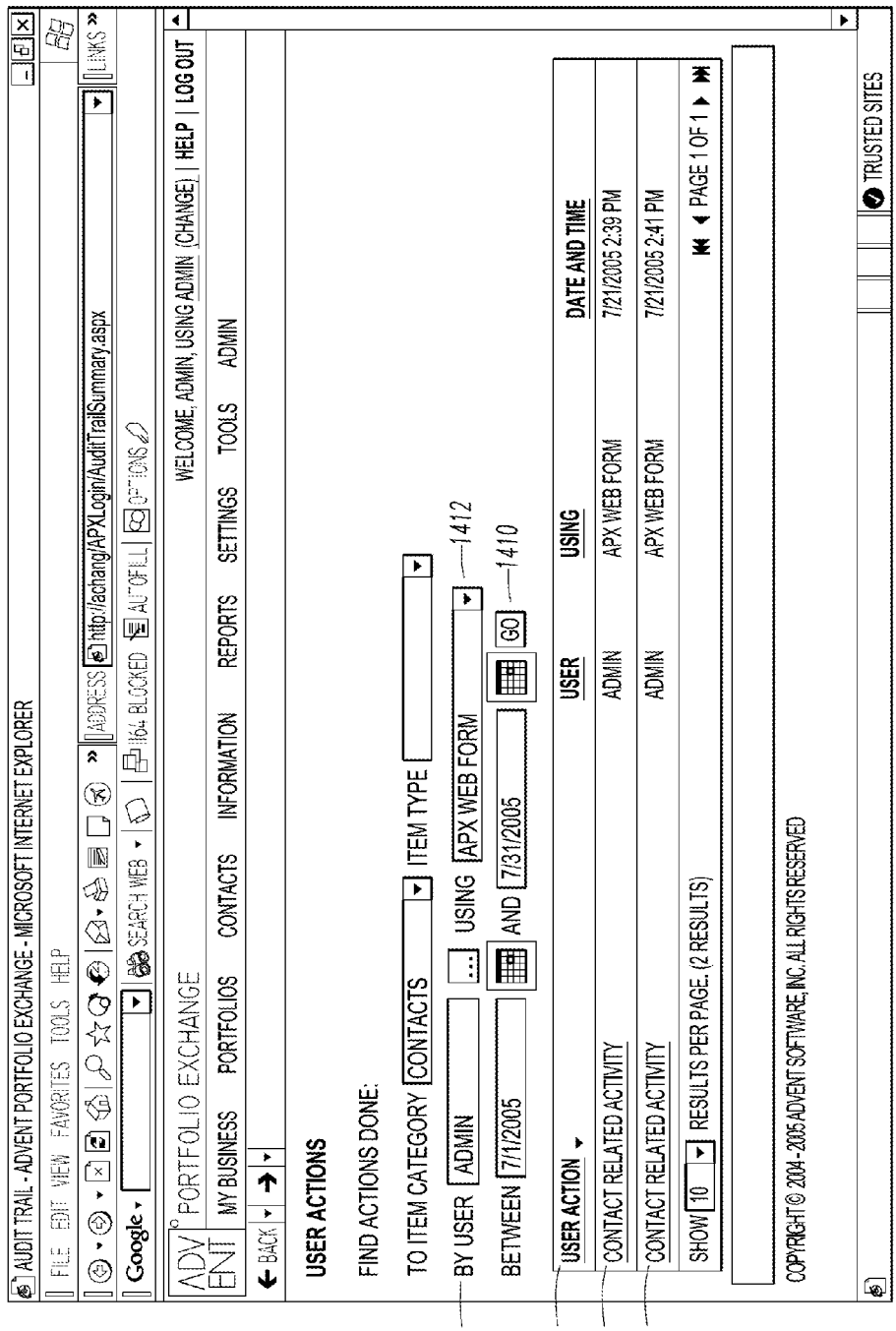

As shown in FIG. 14, the audit trail viewer 126 returns the results of the query entered by the user 110. The results include two "User Actions" 1402 of "Contact related activity" 1404, 1406 that were performed by the "Admin" user 1408 in the time period 1410 of "Jul. 1, 2005" through "Jul. 31, 2005" by using the "APX Web Form" module 1412.

Figure 15A:
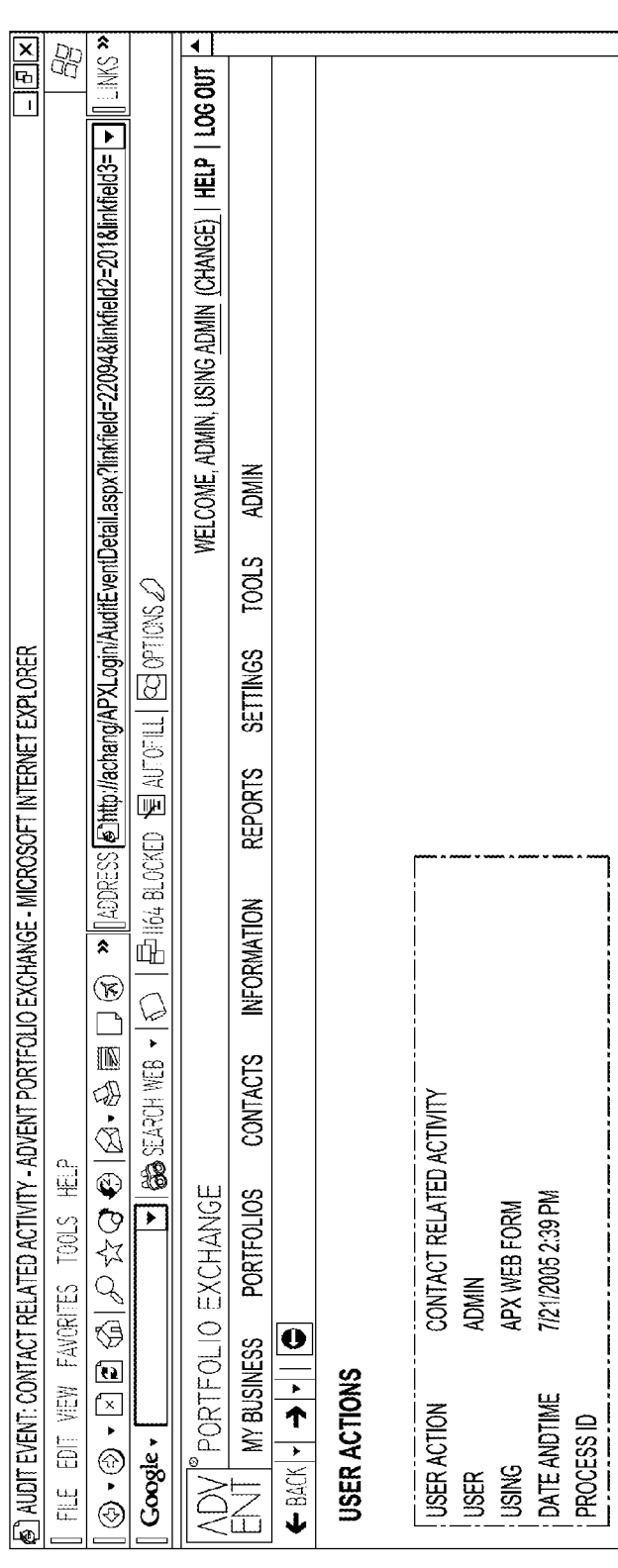

With reference to FIGS. 15A and 15B, the user 110 may select one of the "User Actions" 1406 (see FIG. 14) and see a more detailed overview of the field-level changes that occurred in connection with the particular "User Action" 1406.

Figure 16A:
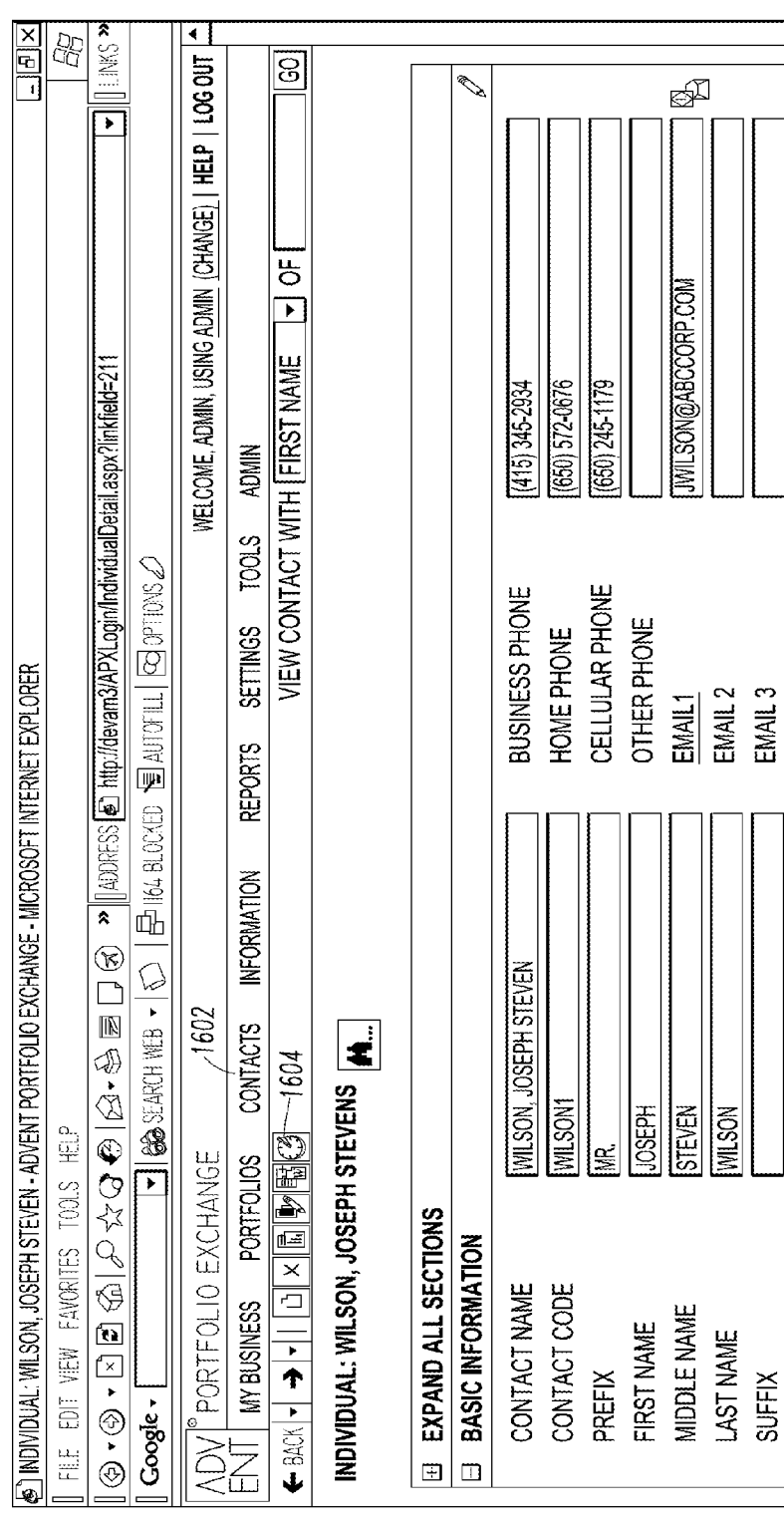
Figure 16B:
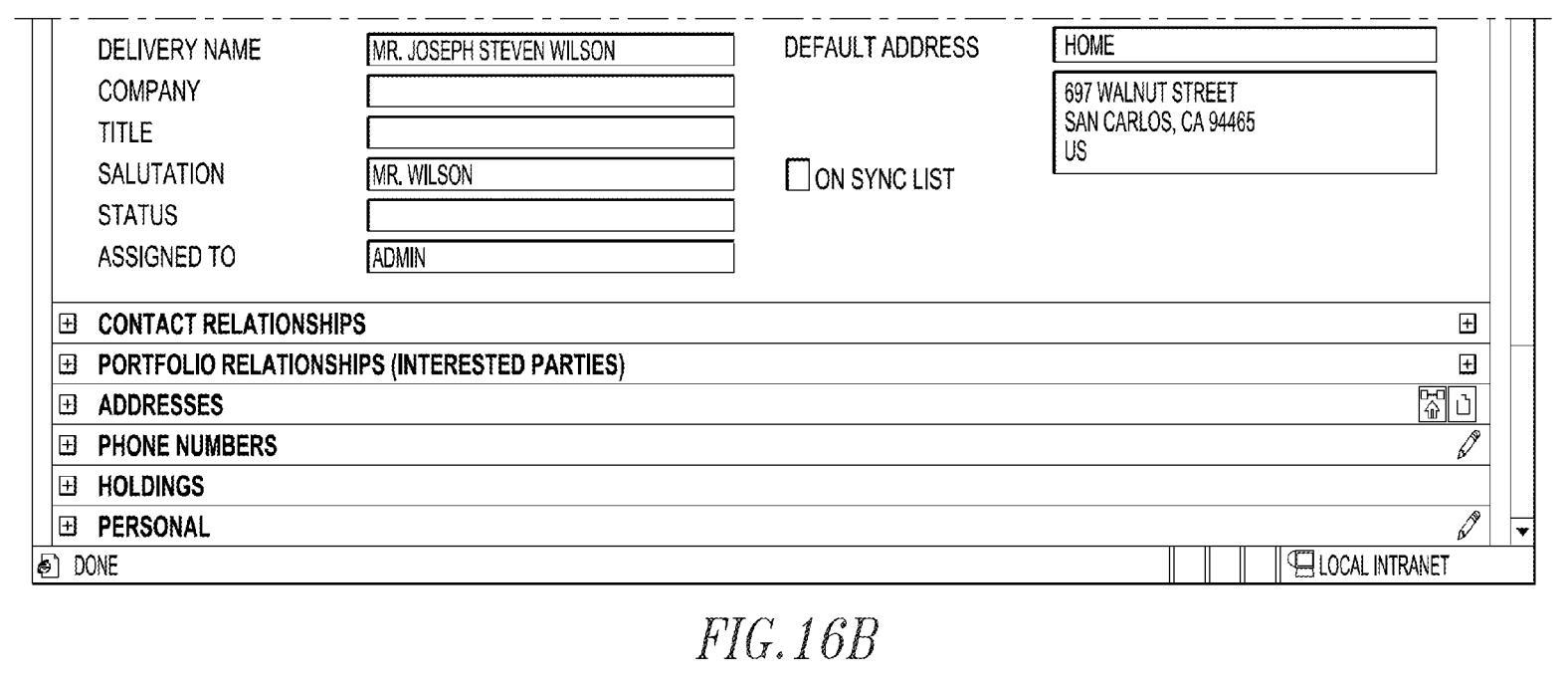

By selecting the "Contacts" link 1602, the screen display of FIGS. 16A and 16B is presented for viewing by the user 110, which includes "Basic Information" for a given contact. By clicking on a sundial icon 1604, the full history of data changes to the contact can be displayed, as shown in FIGS. 17A and 17B for the "Individual" 1702, "Addresses" 1704, and "Phone Numbers" 1706 sections of the screen display.

Figure 18A:
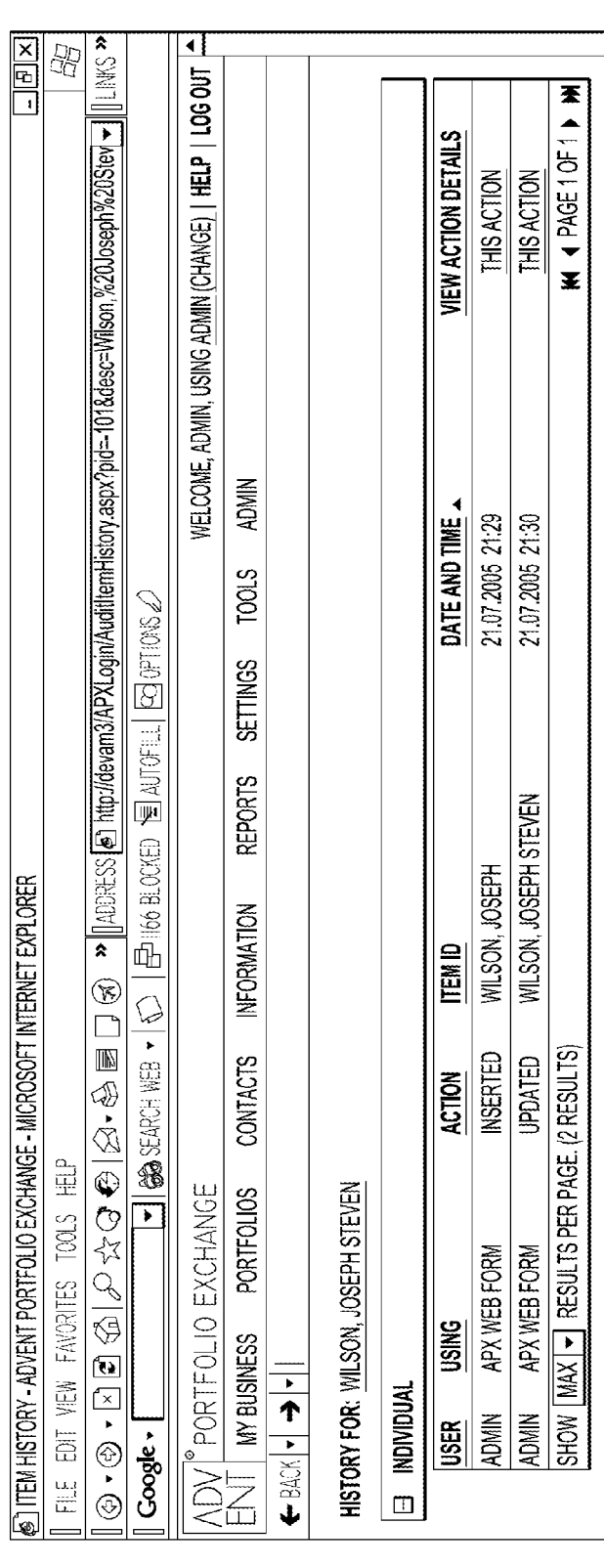

With reference to FIGS. 18A and 18B, the user may click and drill down through any of the line item entries on the screen display of FIG. 17. As shown, a section of FIG. 18 illustrates more details associated with the "Updated" action 1802 that was previously performed on the "Phone Numbers" category 1804 for the given contact.

Audit systems 104 provided in accordance with the prior art may store portfolio definitions, for example, in one table and the transactions associated with each portfolio in a separate table. In connection with performing a search for all portfolios in the transaction system 102 that have changed, the audit trail viewer 126 can display all portfolios whose definitions have changed as well as portfolios whose definitions have not changed but whose transactions have changed. In other words, the audit trail viewer 126 lets users 110 search for changes at a summary level, such as portfolios, contacts, and securities, for example.

It can be seen that embodiments of the audit trail viewer 126 permit users 110 to review a variety of different audit event data and audit trail information. Users 110 can interactively specify search criteria and view resulting audit trail information that matches the search criteria. With the audit trail viewer 126, users 110 can search for specific users 110 that made a change, actions or data changes that were performed in the transaction system 102 (e.g., insertions, updates, deletions), types of data changed (e.g, portfolio, contact, security), and/or when actions or data changes were performed. In various embodiments, users 110 may be permitted to cut and paste data from sections of the audit trail viewer 126 to transfer transactions into a trade blotter, for example, to reverse or re-post transactions. The audit trail viewer 126 includes a user interface that can find events by user 110, module 120, time span, object modified, or specific field values defined as search criteria by the user 110.

The audit trail viewer 126 also provides information on actions to specific data types, including the ability to look for all actions done to a specific type of data (e.g., portfolio transactions), or to a rolled up data type (e.g, portfolio data including settings, transactions, reinvestment exceptions, etc.). For example, if a securities prices update utility is executed in the transaction system 102 that loads prices from a market data provider, that audit event can be configured to appear as a single event in the audit trail viewer 126, even though it made multiple updates to individual prices. The user 110 can then drill-down into the rolled up audit event if desired. In another example, a security update may add dozens of put and call dates into the transaction system 102 and the update of the put and call schedule can be considered a single action or audit event; the user 110 can be permitted to drill down into the data to see the individual put and call dates that were added by the update. The capability of the audit trail viewer 126 to initially display rolled-up summaries of audit events that updated multiple rows in the database 108 provides support for ready data error detection without presenting the user 110 with a high volume of detail data upon an initial search query.

In various embodiments, the audit trail viewer 126 also facilitates aberrant action scanning, or the ability to look for unusual actions or data changes in the transaction system 102 that may be suspicious or require further investigation. To support aberrant action scanning, the audit trail viewer 126 can be configured to provide data entry for search criteria by field value. For example, portfolio transactions can be searched for quantity entries of greater than 50,000 shares. The audit system 104 and the audit trail viewer 126 also facilitate an understanding of object history, or the ability to look at all actions to a specific object (e.g, portfolio, security, etc.) over a given period of time. The audit trail viewer 126 can also be employed to display line item history, or the ability to look at all actions to a specific line item, such as a given row in the database 108 of the transaction system 102, to see what revisions were made to the row over time. Examples of additional activities that can be performed with the audit trail viewer 126 include, without limitation: security master—who changed the interest rate for a particular security and when; prices—what prices were manually updated today and by whom; performance updates—who last updated performance calculations for a portfolio and when; client demographics—when was a client's mailing address changed and by whom.

Various other features may be implemented in connection with embodiments of the audit system 104. The audit trail viewer 126 may be configured with the ability to add to a query the restriction of a given field being set to a given value (e.g, where a stock or security symbol is "IBM"). The capability to turn-off auditing of certain fields on specific tables may also be provided. For example, the audit system 104 may be configured such that all changes to all fields on the "PortfolioTransactions" table should always be audited; conversely, other tables such as look-up tables for country and state names, for example, may be configured not to be audited. In addition, the audit system 104 can be employed to designate tables for which administrators may want to audit changes to some fields but not to other fields. This may be accomplished by storing column identifiers that should be audited in a table, and when a request is received to update the table, the audit system 104 can check to determine whether any of the fields being updated are in the list of column identifiers to be audited. The audit system 104 may also be configured for exception-based auditing, or auditing data only when an exceptional audit event happens, such as a manual adjustment to an automatic data feed or batch process 122. The audit system 104 may also be configured with the capability to "undo" actions and data changes when logically possible, as well as the capability to "backtrack" sources of transactions (e.g., backtrack the blotter entry that caused a transaction row). In various embodiments of the audit system 104, rules-based alerts can be generated and notifications can be communicated when specific business situations are identified in the audit event data. For example, a notification may be generated and communicated by the audit system 104 when the quantity in a transaction is adjusted by more than 50% of its original value. Other automated processes can be initiated based on the audit event data such as, for example, automatically updating performance calculations after transactions are manually updated.

With regard to various security features, the audit system 104 may store "Windows" or other operating system credentials in the audit event data: in addition to storing a user ID, for example, storing operating system user information may help detect invalid users 110. In addition, the audit system 104 may store operating system identifiers and process/application identifiers to facilitate detection of direct (and possibly unauthorized) database 108 access from outside of the transaction system 102. To promote preservation of the veracity of audit trail information, the audit system 104 may be configured with non-repudiation measures such as data encryption with user 110 private key information, for example. In certain embodiments, system administrators can address tampering with audit trail information, while still providing direct database 108 access to the operational tables 108A, 108B, by locking down access to the audit history tables 116A, 116B to prevent direct updates, deletions, or other modifications to the audit event data.

Those skilled in the art will appreciate the many benefits of the various embodiments of the prior art. The audit systems, processes, and tools described herein permit the user to respond to specific portfolio inquiries, track down incorrect manual data entries, and verify compliance with corporate or regulatory policies. Embodiments of the prior art enable system administrators and other management personnel to effectively and efficiently identify what process or person made what data changes in a transaction system during a given time period. The audit systems may be configured to capture substantially all data insertions, deletions, and updates, including before and after field values, along with information associated with the interface or other functionality used to effect the data changes. These systems may capture and present audit trail information within the context of the application, and data changes may be rolled up both to an application context (such as a portfolio or contact), or through a logical unit of work session as defined by the user. The audit systems can employ separate storage of audit event data from operational tables for enhanced transaction system response time and performance. The audit trail data structures may be readily configured as analogous to operational data structures to enable enhanced data access and correlation with operational data in the transaction system. In addition, embodiments of the audit trail viewer described herein provide a centralized audit trail interface to find and display data changes, through any combination of user, date/time, data type, and/or operation.

Other Matters

As applied herein, the term "user" may include an investor, a financial service provider, a financial advisor, system administrators, or any other entity permitted to interface with various embodiments of the prior art.

The term "transaction system" includes any computer system having an operatively associated database capable of storing transaction related data. Examples of "transaction systems" include, without limitation, financial transaction systems, investment management systems, trading systems, recordkeeping systems, and accounting systems. For example, the transaction system marketed as "Advent Portfolio Exchange" or "APX" (offered by Advent Software, Inc.) is one example of a financial transaction system that can be configured for use in conjunction with various embodiments of the prior art.

The term "data change" includes any manipulation of data, such as data in a table of a database, for example. Examples of "data changes" include data insertions, data deletions, and data updates.

The term "audit event" may include, for example, (1) an event that may trigger an audit of data and data changes in a database that correspond to that event, or (2) a collection of data changes that occur during a given time period in a database or during a defined communication session with a database, that may correspond to an event for which the database may be audited.

The term "module" is sometimes used herein to refer to any device or functionality that permits a user to access a transaction system or an audit system (as described herein). Examples of "modules" include, without limitation, web interfaces and graphical user interfaces.

It will be apparent to one of ordinary skill in the art that the present invention described hereinabove may be implemented in many different embodiments of software, firmware, and hardware, some of which are illustrated in the figures. The actual software code or specialized control hardware used to implement some of the present embodiments do not limit the present invention.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the prior art. Where applicable, method steps described herein may be embodied or executed as instructions stored on a computer-readable medium or media.

It is to be understood that the figures and descriptions of the prior art have been simplified to illustrate elements that are relevant for a clear understanding of the prior art, while eliminating, for purposes of clarity, other elements. Those of ordinary skill in the art will recognize, however, that these and other elements may be desirable. However, because such elements are well known in the art, and because they do not facilitate a better understanding of the prior art, a discussion of such elements is Snot provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the prior art, a single component may be replaced by multiple components, and multiple components may be replaced by a single component, to provide an element or structure or to perform a given function or functions. Except where such substitution would not be operative to practice certain embodiments of the prior art, such substitution is considered within the scope of the prior art.

The examples presented herein are intended to illustrate potential and specific implementations of the prior art. It can be appreciated that the examples are intended primarily for purposes of illustration of the prior art for those skilled in the art. The diagrams depicted herein are provided by way of example. There may be variations to these diagrams or the operations described herein without departing from the spirit of the prior art. For instance, in certain cases, method steps or operations may be performed or executed in differing order, or operations may be added, deleted or modified.

Furthermore, whereas particular embodiments of the prior art have been described herein for the purpose of illustrating the prior art and not for the purpose of limiting the same, it will be appreciated by those of ordinary skill in the art that numerous variations of the details, materials and arrangement of elements, steps, structures, and/or parts may be made within the principle and scope of the prior art without departing from the prior art as described in the following claims.

What is claimed is:

1. An audit computer system structured for auditing at least one operational table of a financial transaction computer system for an audit event, the audit computer system comprising:
   (a) a programmable processor; and
   (b) a computer memory in electronic communication with the processor, the memory configured to hold data and instructions, comprising:
      at least one audit history table operatively associated with the operational table of the transaction computer system, each audit history table including at least one database trigger;
      the audit history table being configured to store substantially all data changes which occur in the financial transaction computer system during the audit event by storing the data changes in the audit history table as audit event data;
      the audit history tables being configured to function separately from the operational tables of the transaction computer system;
      at least one audit event table operatively associated with at least one of the audit history tables and the associated operational table, the audit event table being configured for associating the data changes with the audit event, wherein the audit event table groups together a plurality of data changes that occur against multiple tables where the data changes produce a single logical action and track the plurality of data changes in an audit event table;
      at least one representation of the data of an operational table as it appeared on a historical date generated by the operational interaction of the at least one audit history table, the at least one audit event table, and the at least one operational table;
      the database trigger being configured to monitor for one or more data changes in the operational table, and to generate a message describing a monitored data change, and to transmit the message to a SQL server service broker queue;
      the SQL server service broker queue configured, upon the arrival of the message at the queue, to activate a routing procedure to transmit the message to at least one applicable subscriber's service broker queue; and
      the subscriber service broker queue configured, upon arrival of the message, to activate an asynchronous data processing service for the monitored data change.

2. The audit computer system of claim 1, wherein the message is an XML message, and the SQL server service broker queue is an SQL server service broker queue in an SQL server.

3. The audit computer system of claim 1, wherein the transaction computer system includes a financial transaction computer system.

4. The audit computer system of claim 1, further comprising the audit history tables being configured to store the data changes by category.

5. The audit computer system of claim 4, further comprising the audit event table being configured to track at least one of a user who made the data changes, a module used to make the data changes, a time the data changes were made, a date the changes were made, or a job identifier.

6. The audit computer system of claim 1, the memory further comprising a table configured to track all operational tables associated with the audit event to minimize operational overhead for maintaining historical information and audit event data.

7. The audit computer system of claim 1, further comprising the audit history tables being configured to maintain at least one globally unique sequence number in association with the data changes of the audit event.

8. The audit computer system of claim 1, the memory further comprising an audit trail viewer operatively associated with the audit history tables, the audit trail viewer being configured for displaying at least one summary of the audit event data.

9. The audit computer system of claim 8, further comprising the audit trail viewer being configured for displaying "before" and "after" data values.

10. The audit computer system of claim 8, further comprising the audit trail viewer being configured for querying the audit system by at least one of a category, a user, a time period, or a module.

11. The audit computer system of claim 8, further comprising the audit trail viewer being configured to provide a detailed overview of field-level data changes that occurred in connection with the audit event.

12. The audit computer system of claim 8, further comprising the audit trail viewer being configured to permit cut and paste data operations from sections of the audit trail viewer.

13. The audit computer system of claim 8, wherein the summary includes a rolled-up summary.

14. The audit computer system of claim 1, further comprising the audit computer system being configured for exception-based auditing.

15. The audit computer system of claim 1, further comprising the audit computer system being configured with the capability to undo the data changes associated with the audit event.

16. The audit computer system of claim 1, further comprising the audit computer system being configured to generate at least one notification based on identification of a business situation in the audit event data.

17. The audit computer system of claim 1, wherein the audit history table stores the data changes using a row-versioning method for storing the data changes in the audit history table as audit event data.

18. A method using a computer system for auditing at least one operational table of a financial transaction computer system for an audit event, the method comprising:
   monitoring with a computer system one or more data changes in the operational table of the transaction computer system using at least one database trigger operatively associated with an audit history table;
   grouping, together, using the computer system, a plurality of data changes that occur against multiple tables where the data changes produce a single logical action and track the plurality of data changes in an audit table;
   generating at least one representation of the data of an operational table as it appeared on a historical date by the operational interaction of the audit history table, the audit event table, and the at least one operational table;
   storing substantially all data changes which occur in the financial transaction computer system during, the audit by storing the data changes in the audit history table as audit event data; and
   permitting the audit history tables to function separately from the operational tables of the transaction computer system;
   generating, using the database trigger, a message describing a monitored data change, and transmitting the message to a SQL server service broker queue;
   activating, using the SQL server service broker queue, upon the arrival of the message at the queue, a routing procedure to transmit the message to at least one applicable subscriber's service broker queue; and
   activating, using the subscriber service broker queue, upon arrival of the message, an asynchronous data processing service for the monitored data change.

19. The method of claim 18, wherein the message is an XML message, and the SQL server service broker queue is an SQL server service broker queue in an SQL server.

20. The method of claim 18, further comprising storing the data changes by category.

21. The method of claim 18, further comprising tracking at least one of a user who made the data changes, a module used to make the data changes, a time the data changes were made, a date the data changes were made, or a job identifier.

22. The method of claim 18, further comprising storing the data changes using a row-versioning method for storing the data changes in the audit history table as audit event data.

23. A non-transitory computer-readable medium including instructions for auditing at least one operational table of a financial transaction computer system for an audit event, the medium comprising:
   instructions for monitoring one or more data changes in the operational table of the transaction computer system including at least one database trigger operatively associated with an audit history table;
   instructions for storing substantially all data changes which occur in the transaction computer system during the audit event including instructions for storing the data changes in the audit history table as audit event data;
   instructions for permitting the audit history tables to function separately from the function of the operational tables of the financial transaction computer system;
   instructions for grouping together a plurality of data changes that occur against multiple tables where the data changes produce a single logical action and track the plurality of data changes in an audit event table;
   instructions for generating at least one representation of the data of an operational table as it appeared on a historical date by the operational interaction of the audit history table, the audit event table, and the at least one operational table;
   instructions for generating, using the database trigger, a message describing a monitored data change, and transmitting the message to a SQL server service broker queue;
   instructions for activating, using the SQL server service broker queue, upon the arrival of the message at the queue, a routing procedure to transmit the message to at least one applicable subscriber's service broker queue; and
   instructions for activating, using the subscriber's service broker queue, upon arrival of the message, an asynchronous data processing service for the monitored data change.

24. The non-transitory machine readable memory medium in claim 23, wherein the message is an XML message, and the SQL server service broker queue is an SQL server service broker queue in an SQL server.

25. The non-transitory machine readable memory medium in claim 23, further comprising instructions for storing the data changes using a row-versioning approach for storing the data changes in the audit history table as audit event data.

* * * * *